(12) United States Patent
Pasquero et al.

(10) Patent No.: US 8,532,675 B1
(45) Date of Patent: Sep. 10, 2013

(54) MOBILE COMMUNICATION DEVICE USER INTERFACE FOR MANIPULATION OF DATA ITEMS IN A PHYSICAL SPACE

(75) Inventors: Jerome Pasquero, Kitchener (CA); David Ryan Walker, Waterloo (CA)

(73) Assignee: Blackberry Limited, Waterloo (CA)

( * ) Notice: Subject to any disclaimer, the term of this patent is extended or adjusted under 35 U.S.C. 154(b) by 0 days.

(21) Appl. No.: 13/534,226

(22) Filed: Jun. 27, 2012

(51) Int. Cl.
*H04W 24/00* (2009.01)

(52) U.S. Cl.
USPC ............. 455/456.3; 455/414.1; 455/404.2; 455/418; 455/550.1; 455/419; 345/158; 345/173; 345/679

(58) Field of Classification Search
USPC ......... 455/414.1, 420, 550.1, 556.2, 575.5, 455/404.2, 418–419, 456.3, 457; 345/158, 345/156, 157, 168, 169, 173, 679; 715/702, 715/863; 348/14.07, 208.2–208.4; 382/187, 382/103, 115, 117, 118
See application file for complete search history.

(56) References Cited

U.S. PATENT DOCUMENTS

| | | | |
|---|---|---|---|
| 6,154,723 A | 11/2000 | Cox et al. | |
| 6,181,343 B1 | 1/2001 | Lyons | |
| 6,244,987 B1 | 6/2001 | Ohsuga et al. | |
| 6,600,480 B2 | 7/2003 | Natoli | |
| 6,961,060 B1 | 11/2005 | Mochizuki et al. | |
| 7,043,695 B2 | 5/2006 | Elber et al. | |
| 7,084,888 B2 | 8/2006 | Takahama et al. | |
| 7,180,500 B2 | 2/2007 | Marvit et al. | |
| 7,184,037 B2 | 2/2007 | Gallery et al. | |
| 7,236,618 B1 | 6/2007 | Chui et al. | |
| 7,271,795 B2 | 9/2007 | Bradski | |
| 7,280,096 B2 | 10/2007 | Marvit et al. | |
| 7,403,220 B2 | 7/2008 | MacIntosh et al. | |
| 7,519,918 B2 | 4/2009 | Trantow | |
| 7,667,686 B2 | 2/2010 | Suh | |

(Continued)

FOREIGN PATENT DOCUMENTS

| | | |
|---|---|---|
| EP | 1209589 A2 | 5/2002 |
| EP | 1566752 A2 | 8/2005 |
| EP | 2131226 A2 | 12/2009 |

OTHER PUBLICATIONS

Atcheson, B., "Efficient Face Tracking for User Interfaces", Dept. of Computer Science, Univ. of British Columbia, 1998, pp. 1-9.

(Continued)

*Primary Examiner* — Vladimir Magloire
*Assistant Examiner* — Babar Sarwar
(74) *Attorney, Agent, or Firm* — Jenna L. Wilson; Dimock Stratton LLP

(57) ABSTRACT

A device, system and method are provided for creation, accessing, and management of data items on a computing device, such as a mobile device, using physically-defined spatial relationships between the data items and the user. At least one of a tracking user interface and a kinetic user interface is used to determine the physical location of the mobile device with respect to the user, rather than with reference to a geographic location. Using one or both of these interfaces, individual data items may be associated with a location in the physical space surrounding the user. Data items may also be associated with a particular characteristic, such as a category or tag, based on its associated location. Data items may be subsequently retrieved by holding the mobile device in the physical space surrounding the user, then identifying those data items having an associated location proximate to the mobile device location.

22 Claims, 18 Drawing Sheets

(56) References Cited

U.S. PATENT DOCUMENTS

| | | | |
|---|---|---|---|
| 7,688,306 | B2 | 3/2010 | Wehrenberg et al. |
| 8,015,718 | B2 | 9/2011 | Jaiswal et al. |
| 8,046,719 | B2 | 10/2011 | Skourup et al. |
| 2002/0089550 | A1 | 7/2002 | Orbanes et al. |
| 2004/0036675 | A1 | 2/2004 | Kajitsuka |
| 2006/0017692 | A1* | 1/2006 | Wehrenberg et al. .......... 345/156 |
| 2007/0176898 | A1* | 8/2007 | Suh .............................. 345/158 |
| 2007/0222746 | A1 | 9/2007 | LeVine |
| 2009/0051648 | A1 | 2/2009 | Shamaie et al. |
| 2009/0265671 | A1 | 10/2009 | Sachs et al. |
| 2010/0053322 | A1 | 3/2010 | Marti et al. |
| 2010/0073329 | A1 | 3/2010 | Raman et al. |
| 2010/0093365 | A1 | 4/2010 | Bloebaum |
| 2010/0124949 | A1 | 5/2010 | Demuynck et al. |
| 2010/0161084 | A1 | 6/2010 | Zhao et al. |
| 2010/0328201 | A1 | 12/2010 | Marvit et al. |
| 2011/0029869 | A1 | 2/2011 | McLennan |
| 2011/0029903 | A1 | 2/2011 | Schooleman et al. |
| 2011/0063286 | A1 | 3/2011 | Roberts et al. |
| 2011/0081923 | A1 | 4/2011 | Forutanpour et al. |
| 2011/0107270 | A1 | 5/2011 | Wang et al. |
| 2011/0193788 | A1 | 8/2011 | King et al. |
| 2011/0216002 | A1 | 9/2011 | Weising et al. |
| 2011/0246904 | A1 | 10/2011 | Pinto et al. |
| 2011/0252320 | A1 | 10/2011 | Arrasvuori et al. |
| 2011/0298824 | A1 | 12/2011 | Lee et al. |
| 2012/0001722 | A1 | 1/2012 | Jaiswal et al. |
| 2012/0017147 | A1 | 1/2012 | Mark |
| 2012/0032877 | A1 | 2/2012 | Watkins, Jr. et al. |

OTHER PUBLICATIONS

Hartley, A., "BumpTop brings 'Minority Report style control' to PC", Oct. 1, 2009, http://www.techradar.com/news/computing/pc/bumptop-brings-minority-report-style-control-to-pc-639987, pp. 1-4, Future Publishing Limited, UK.

Bradski, G. R., "Computer Vision Face Tracking for Use in a Perceptual User Interface", Microcomputer Research Lab, Santa Clara, CA, Intel Corporation, 1998, pp. 1-15.

Hua, G., Yang, T.-Y., Vasireddy, S., "PEYE: Toward a Visual Motion Based Perceptual Interface for Mobile Devices", Microsoft Live Labs Research, Redmond WA, HCI 2007, LNCS 4796, pp. 39-48, 2007, Springer-Verlag Berlin Heidelberg 2007.

Demirdjian, D. et al., "Activity maps for location-aware computing", MIT Artificial Intelligence Laboratory, Cambridge MA, 2002, pp. 1-6.

Leroy, J., Mancas, M., Gosselin, B., "Personal Space Augmented Reality Tool", UMONS, Engineering Faculty (FPMs)—IT Research Unit—TCTS Lab, Mons, Belgium, 2011, pp. 1-8.

Ballagas, R. et al., "The Smart Phone: A Ubiquitous Input Device", Published by the IEEE CS and IEEE ComSoc, 2006, pp. 70-77.

Kela, J. et al., "Accelerometer-based Gesture Control for a Design Environment", 2005, pp. 51-55, retrieved from the internet URL <http://www.vtt.fi/liitetiedostot/cluster1_tieto-ja_viestintatekniikka_elektroniikka/ICT_tiet_vsk_2005.pdf#page=51.

Linjama, J., Häkkilä, J., Ronkainen, S., "Gesture Interfaces for Mobile Devices—Minimalist Approach for Haptic Interaction", 2005, pp. 1-4, retrieved from the Internet URL <http://www.dcs.gla.ac.uk/haptic/haptics%20web%20pages_files/Linjama%20et%20al..pdf.

Parikh, N., "Accelerometer based motion gestures for Mobile Devices", Master's Theses and Graduate Research, San Jose State University, 2008, pp. 1-67, retrieved from the internet URL <http://scholarworks.sjsu.edu/cgi/viewcontent.cgi?article=1102&context=etd_projects.

Sherman, P. J., "Where's My Stuff? Beyond the Nexted Folder Metaphor", Mar. 12, 2008, pp. 1-13, retrieved from the internet URL <http://www.uxmatters.com/mt/archives/2008/03/wheres-my-stuff-beyond-the-nested-folder-metaphor.php.

Pallotta, V. et al., "RoamBlog: Outdoor and Indoor Geo-blogging Enhanced with Contextual Service Provisioning for Mobile Internet Users", n: Proceedings of the 1st International workshop on Distributed Agent-based Retrieval Tools, pp. 103-121, Polimetrica International Scientific Publisher, DART, ISBN 88-7699-043-7, Jun. 2006.

TAT, "Mobile User Interface Blog: Nintendo DSI demo video using Facetracking to control Parallax", Mar. 1, 2010, pp. 1-3.

Extended European Search Report dated Dec. 12, 2012 from EP 12173769.6, pp. 1-7.

Frank Chun Vat Li. David Dearman & Khai N. Truong: "Virtual Shelves: Interactions with Orientation Aware Devices", Oct. 7, 2009, pp. 1-4, XP002688156, Retrieved from the Internet: URL:http://www.khaitruong.com/publications/UIST-2009b.pdf [retrieved on Nov. 26, 2012].

* cited by examiner

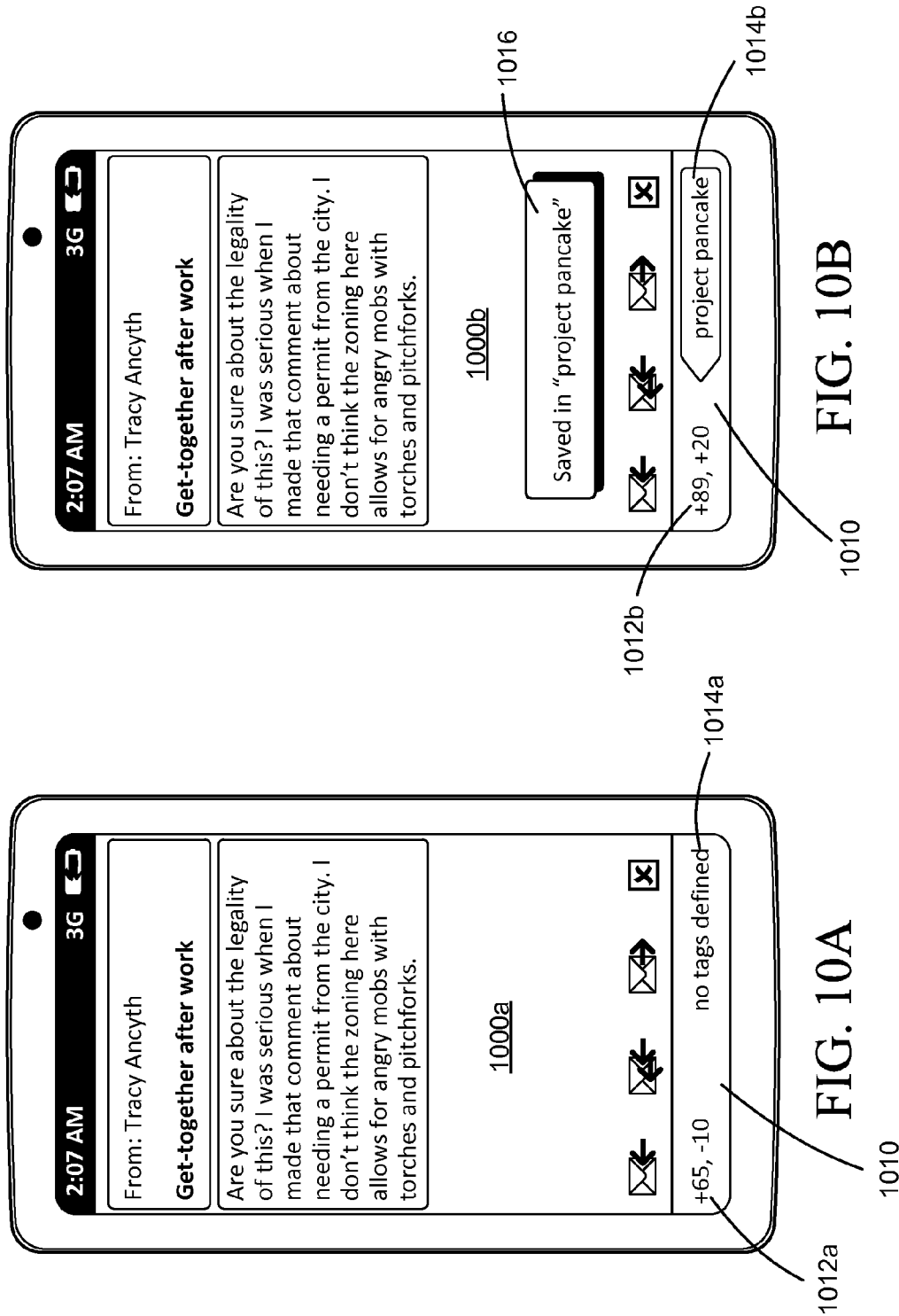

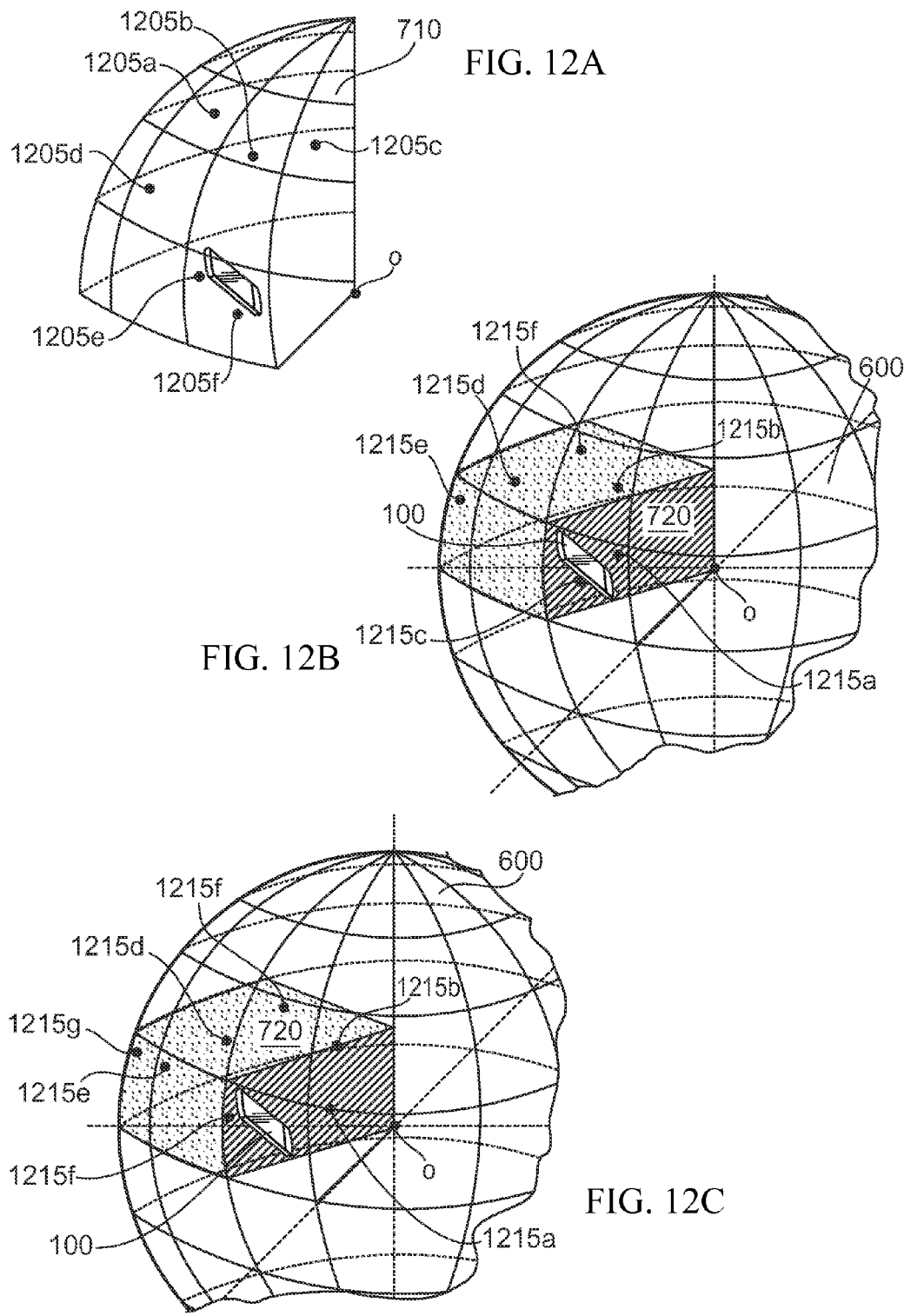

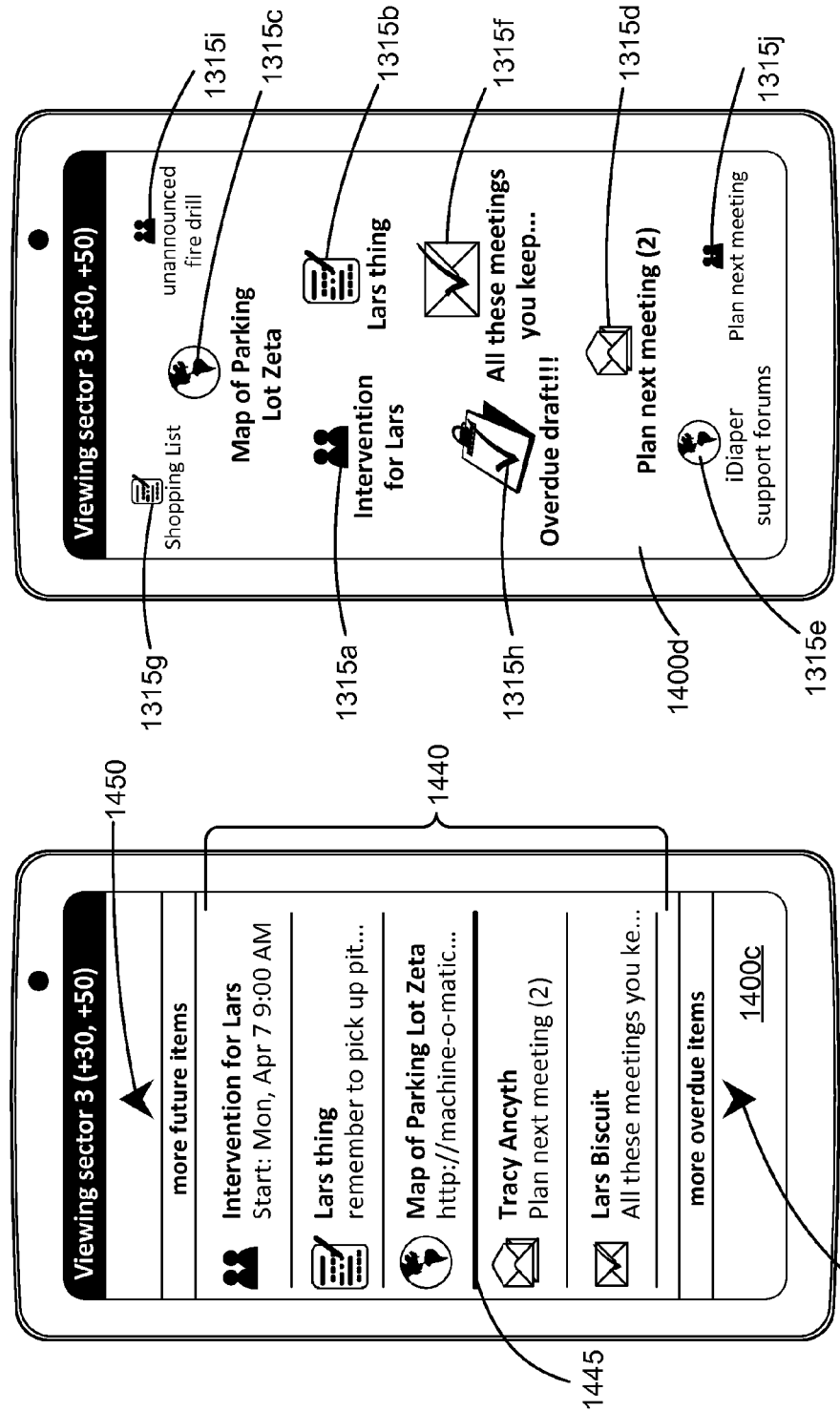

MOBILE COMMUNICATION DEVICE USER INTERFACE FOR MANIPULATION OF DATA ITEMS IN A PHYSICAL SPACE

TECHNICAL FIELD

The present disclosure relates to a user interface implemented using a mobile device to create, access and manage data items in relation to a non-geographic physical region.

TECHNICAL BACKGROUND

The organization of data items, such as such as messages, calendar events, tasks, memos, documents, and so forth, is generally driven by information or characteristics that are inherent or expressly present in the data items themselves. Calendar events and tasks, for example, can be sorted according to their associated dates, and events and tasks can be retrieved for a given date can be retrieved on a daily basis. Searches of documents can be executed based on keywords included in the content of the document, or embedded in metadata accompanying the document. In some cases, the characteristics that are inherent in a data item are prescribed by the user: for example, email messages can be filed in user-defined folders according to user-defined labels, and metadata can be added to a document or other data item by the user.

Methods of organization and accessing organized data items are usually constrained to user interface mechanisms supporting text or visual content, since text and graphics are a primary modes of communication between the user and the computing device used to manage the data items. Names of folders and labels are typically defined using text, although in some instances a different informational element (a color or an icon, or both) might be used to distinguish folders and labels (a flag associated with an email in an inbox listing may signify a message that the user needs to reply to; data items in the folder represented by the blue folder icon might be work-related items, while those data items represented by the purple folder icon are personal). In any case, for the organization scheme to be effective, the user must remember the relationship between the text label, color, or icon, and the content of the associated data items.

Visual or textual indicators, though, are not the only means by which humans can organize information or recall associations between data items or even physical objects. For example, spatial relationships between objects (virtual or physical), and spatial relationships between objects and the user, can also be used for organization: urgent matters closer to the user (on a desk), and less urgent matters some distance away (on a side table); incoming documents and documents in a pile on the left, closer to the user (a physical inbox), and outgoing documents in a pile on the right, closer to the door (an outbox); lettermail to be posted on the front hall table, next to the user's house keys, so she will remember to bring the mail with her on her way to work. Some spatial relationships between digital items—data items, such as the aforementioned calendar events, messages, and tasks—can be represented in this manner, but typically this is implemented in a two-dimensional plan view on a computing device display, which limits the ability to represent data items in a truly three-dimensional spatial relationship, or according to a "nearer-farther" scheme.

BRIEF DESCRIPTION OF THE DRAWINGS

In drawings which illustrate by way of example only embodiments of the present disclosure, in which like reference numerals describe similar items throughout the various figures.

FIGS. 10A to 10H are example graphical user interfaces for creating or storing data items in cooperation with a tracking or kinetic user interface.

FIG. 12A is a perspective view of a section of the physical space of FIG. 6 including virtual placement of data items within the section.

FIGS. 12B to 12E are perspective views of virtually placed data items in a section of the physical space of FIG. 6.

FIGS. 14A to 14D are example graphical user interfaces for use in retrieving virtually placed data items.

DETAILED DESCRIPTION OF THE INVENTION

Figure 1:
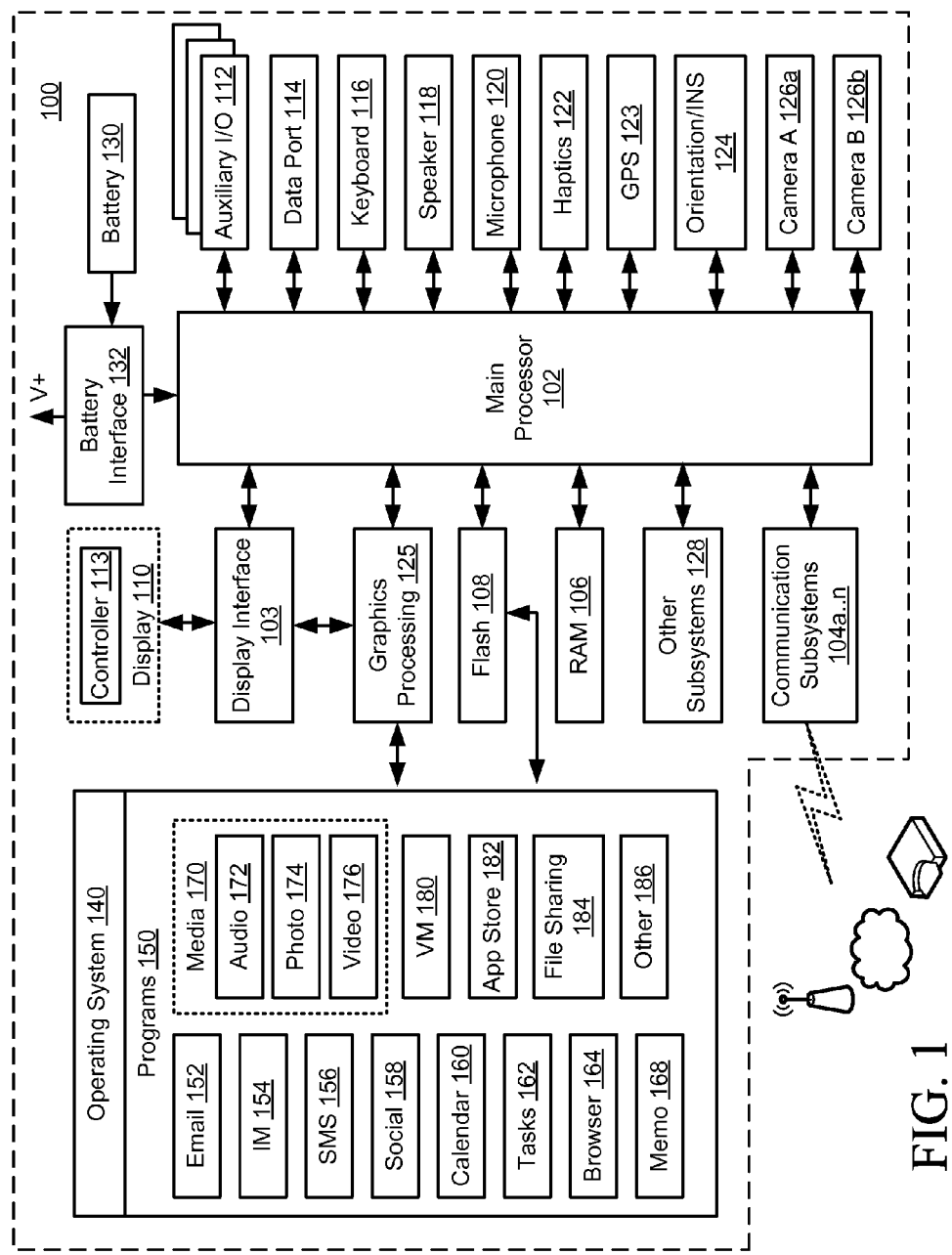
FIG. 1 is a block diagram of an example of an electronic device.

The embodiments described herein provide a device, system and methods for creation, accessing, and management of data items on a computing device, such as a mobile device, using physically-defined spatial relationships between the data items and the user. These embodiments can be implemented by leveraging techniques and technologies such as those used in mobile device-implemented virtual and augmented reality environments. In the examples given below, these technologies are applied to user interaction with personal productivity applications and data items, without requiring immersive virtual reality equipment to interact with data items.

This spatial relationship can be defined in relation to a non-geographic physical region, i.e., not with reference to a terrestrial location of the user or the computing device, but rather with reference to the device's position with respect to the user. The user can use the various user interface mechanisms on a mobile device to "place" and otherwise manipulate data items within the physical region, using the device's own physical location with respect to the user as an input. The examples described herein can be implemented using either kinetic or tracking user interfaces, or both; these interfaces can be used to determine the position of the device with respect to the user using absolute positioning (based on image data and facial or object recognition, for example) and/or dead reckoning (using kinetic data).

These embodiments will be described and illustrated primarily in relation to electronic devices, such as tablet computers, smartphones, or any other suitable electronic device provided with sufficient user interface mechanisms as will be understood by those skilled in the art from the following description. It will be appreciated by those skilled in the art, however, that this description is not intended to limit the scope of the described embodiments to implementation on tablets or smartphones in particular. For example, the methods and systems described herein may be applied to any appropriate communication device or data processing device adapted with suitable user interface mechanisms, whether or not the device is adapted to communicate with another communication or data processing device using a network communication interface adapted to communicate over a fixed or wireless connection, whether provided with voice communication capabilities or not. The device may be additionally or alternatively adapted to process data and carry out operations on data in response to user commands for any number of purposes, including productivity and entertainment. In some examples, data may be accessed from a different device. Therefore, the examples described herein may be implemented in whole or in part on electronic devices including without limitation cellular phones, smartphones, wireless organizers, personal digital assistants, desktop computers, terminals, laptops, tablets, e-book readers, handheld wireless communication devices, notebook computers, portable gaming devices, tabletop displays, Internet-connected televisions, set-top boxes, digital picture frames, digital cameras, in-vehicle entertainment systems, entertainment devices such as MP3 or video players, and the like. In the primary examples described herein, the electronic device includes an integrated touchscreen display; however, it will be readily understood by those skilled in the art that a touchscreen display is not necessary. In some cases, the electronic device may be configured to output data to be painted to an external display unit such as an external monitor or panel, tablet, television screen, projector, or virtual retinal display (via a data port or transmitter, such as a Bluetooth® transceiver, USB port, HDMI port, DVI port, and the like). For such devices, references herein to a "display," "display screen" or "display interface" are intended to encompass both integrated and external display units.

FIG. 1 is a block diagram of an example of a mobile electronic device 100 that may be used with the embodiments described herein. It should be understood that the components described in FIG. 1 are optional and that an electronic device used with various embodiments described herein may include or omit components described in relation to FIG. 1. The electronic device 100 includes a number of components such as a main processor 102 that controls the device's overall operation. Other processors or components can be included for functions not explicitly detailed herein, such as power management and conversion, encoding and decoding of audio and other data, and the like. Those skilled in the part will appreciate that such components, if present, are not illustrated here for ease of exposition.

The electronic device 100 may be a battery-powered device, having a battery interface 132 for receiving one or more batteries 130. Alternatively or additionally, the electronic device 100 may be provided with an external power supply (e.g., mains power, using a suitable adapter as necessary). If configured for communication functions, such as data or voice communications, one or more communication subsystems 104a . . . n in communication with the processor are included. Data received by the electronic device 100 can be received via one of these subsystems and decompressed and/or decrypted as necessary using techniques and components known to persons of skill in the art. The communication subsystems 104a . . . n typically include a receiver, transmitter, and associated components such as one or more embedded or internal antenna elements, local oscillators, and a digital signal processor in communication with the transmitter and receiver. The particular design of the communication subsystems 104a . . . n is dependent upon the communication network with which the subsystem is intended to operate.

For example, data may be communicated to and from the electronic device 100 using a wireless communication subsystem 104a over a wireless network. In this example, the wireless communication subsystem 104a is configured in accordance with one or more wireless communications standards. New wireless communications standards are still being defined, but it is believed that they will have similarities to the network behaviour described herein, and it will also be understood by persons skilled in the art that the embodiments described herein are intended to use any other suitable standards that are developed in the future. The wireless link connecting the wireless communication subsystem 104a with the wireless network represents one or more different Radio Frequency (RF) channels, operating according to defined protocols specified for the wireless communications standard, and optionally other network communications.

The electronic device 100 may be provided with other communication subsystems, such as a wireless LAN (WLAN) communication subsystem 104b or a short-range and/or near-field communications subsystem 104c. The WLAN communication subsystem 104b may operate in accordance with a known network protocol such as one or more of the 802.11™ family of standards developed or maintained by IEEE. The communications subsystems 104b and 104c provide for communication between the electronic device 100 and different systems or devices without the use of the wireless network, over varying distances that may be less than the distance over which the communication subsystem 104a can communicate with the wireless network. The subsystem 104c can include an infrared device and associated circuits and/or other components for short-range or near-field communication.

It should be understood that integration of any of the communication subsystems 104a . . . n within the device chassis itself is optional. Alternatively, one or more of the communication subsystem may be provided by a dongle or other peripheral device (not shown) connected to the electronic device 100, either wirelessly or by a fixed connection (for example, by a USB port) to provide the electronic device 100 with wireless communication capabilities. If provided onboard the electronic device 100, the communication subsystems 104a . . . n may be separate from, or integrated with, each other.

Possible network topologies for use with the device 100 will be known to those skilled in the art. As only one example, a host system may be provided, which can be an own-premises local area network (LAN), or wide area network in communication with LANs, with local computing resources such as one or more servers, data repositories and client devices such as terminals. The host system may comprise those components necessary to provide services to users over the LAN and also over a public or private network, such as the Internet, at their respective devices 100. The services can include but are not limited to messaging, directory services, collaborative applications, calendaring applications, search engines and file servers. The device 100 could access the host system using one or more of its communication subsystems 104a . . . n, for example through an access point, via the public or private network, and optionally via a public switched telephone network and a wireless network.

The main processor 102 also interacts with additional subsystems (if present), the general configuration and implementation of which will be known to those skilled in the art, such as a Random Access Memory (RAM) 106, a flash memory 108, a display interface 103 and optionally a display 110, other data and memory access interfaces such as a visualization (graphics) processor 125, auxiliary input/output systems 112, one or more data ports 114, a keyboard 116, speaker 118, microphone 120, haptics module 122 (e.g., a driver and a vibratory component, such as a motor), GPS or other location tracking module 123, orientation and/or inertial navigation system (INS) module 124, one or more cameras, indicated at 126a and 126b and other subsystems 128. In some cases, zero, one or more of each of these various subsystems may be provided, and some subsystem functions may be provided by software, hardware, or a combination of both. For example, a physical keyboard 116 may not be provided integrated with the device 100; instead a virtual keyboard may be implemented for those devices 100 bearing touch screens, using software components executing at the device. Additional display interfaces 103 or displays 110 may be provided, as well as additional dedicated processors besides the visualization processor 125 to execute computations that would otherwise be executed by the host processor 102. Additional memory or storage modules, not shown in FIG. 1, may also be provided for storing data, which can contain flash memory modules as well. Examples include non-volatile memory cards such in the microSD and miniSD formats defined by the SD Association, San Ramon, Calif. Such storage modules may communicate with the mobile device 100 using a fixed or wireless connection.

A visualization (graphics) processor or module 125 may be included in the electronic device 100. The visualization module 125 analyzes and processes data for presentation via the display interface 103 and display 110. Data originally prepared for visualization on a large-screen display may require additional processing prior to visualization on a small-screen display. This additional processing may be accomplished by the visualization module 125. As will be appreciated by those of skill in the art, the visualization module can be implemented in hardware, software, or a combination thereof, and can include a dedicated image processor and associated circuitry, or can be implemented within main processor 102. Rendered data for painting to the display is provided to the display 110 (whether the display 110 is external to the device 100, or integrated) via the display interface 103.

Content that is rendered for display may be obtained from a document such as a message, word processor document, webpage, or similar file, which is either obtained from memory at the device such as flash memory 108 or RAM 106, or obtained over a network connection. A suitable application, such as a messaging application, viewer application, or browser application, or other suitable application, can process and render the document for display in accordance with any formatting or stylistic directives included with the document. FIG. 1 illustrates possible components of the device 100, such as the operating system 140 and programs 150, which can include zero, one or more applications such as those depicted. Other software components 190 besides those explicitly illustrated in FIG. 1 can also be included, as is well known to those skilled in the art. Programs 150 may be installed on the device 100 during its manufacture or together with loading of the operating system 140, or at a subsequent time once the device 100 is delivered to the user. These software applications may be supplied by the device manufacturer or operating system provider, or may be third party applications. The additional applications can be loaded onto the device 100 through at least one of the communications subsystems 104a . . . n, the data port 114, or any other suitable device subsystem 128.

Example applications include an email messaging application 152, as well as other types of messaging applications for instant messaging (IM) 154 and Short Message Service (SMS 156). Other applications for messaging can be included as well, and multiple applications for each type of message format may be loaded onto the device 100; there may be, for example, multiple email messaging applications 152 and multiple instant messaging applications 154, each associated with a different user account or server. Alternatively different applications may be provided to access the same set of messages or message types; for example, a unified message box function or application may be provided on the device 100 that lists messages received at and/or sent from the device, regardless of message format or messaging account. Other applications include social networking applications 158, which may provide messaging function, a content reader function, or both; browser applications 164; calendar applications 160, task applications 162 and memo applications 168, which may permit the user of the device 100 to create or receive files or data items for use in personal organization; media applications 170, which can include separate components for playback, recording and/or editing of audio files 172 (including playlists), photographs 174, and video files 176; virtual machines 180, which when executing provide discrete runtime environments for other code on the device 100; "app store" applications 182 for accessing vendor sites offering software applications for download (and optionally for purchase) to the device 100; direct or peer-to-peer file sharing or synchronization applications 184 for managing transfer of files between the device 100 and another device or server such as a synchronization or hosting service, using any suitable protocol; and other applications 186.

For those applications that have a need to store data at the device 100, the application may store data in the device's file system; however, a dedicated data store or data structure may be defined for each application. This data store may be, for example, a message store for each messaging application. Permission to access the data store may be limited to the associated application, although permissions may be configured differently.

In some examples, the electronic device 100 may be a touchscreen-based device, in which the display 110 includes a touchscreen interface that provides both a display visual presentation of data and graphical user interfaces, and an input subsystem for detecting user input via a graphical user interface presented on the display 110 that may be converted to instructions for execution by the device 100. A display 110 that is a touchscreen may be the principal user interface provided on the electronic device 100, in which case other user input mechanisms such as the keyboard 116 may not be present, although in some examples, a keyboard 116 and/or additional buttons, a trackpad or other user interface mechanisms may still be provided.

Generally, user interface (UI) mechanisms may be implemented at the electronic device 100 as hardware, software, or a combination of both hardware and software. Graphical user interfaces (GUIs), mentioned above, are implemented using the display interface 103 and display 100 and corresponding software executed at the device. Touch UIs are implemented using a touch sensing mechanism, such as the aforementioned trackpad, and/or touchscreen interface, discussed in more detail below, along with appropriate software used to convert touch information to signals or instructions. A voice or speech UI can be implemented using the microphone 120, together with modules implemented in hardware or software operable to detect speech patterns or other sounds, and to decode or correlate detected sounds to user commands. A tracking (e.g., eye-tracking or facial tracking) UI or perceptual UI can be implemented using the camera 126a and/or 126b, again with appropriate hardware and/or software modules to analyze received visual data to detect the presence or position of a user's face or eyes, which are used to derive commands or contextual information to control device operations. A kinetic UI can be implemented using the device's orientation/INS module 124, or using the GPS module 123 or another locating technology module, together with appropriate software and/ or hardware modules to detect the motion or position of the electronic device 100, again to derive commands or contextual information to control the device. Various components used to enable these various forms of UIs may serve other interface functions beyond the purpose of user or contextual control of the electronic device 100. The microphone 120, for example, is typically used in the course of voice communications on a smartphone, in which case the speech and other sounds picked up by the microphone are simply converted to data for transmission over the wireless network and are not analyzed to detect context or commands. Similarly, the camera 126a and/or 126b are typically used to generate user content (e.g., video and still photographs) without further analysis to identify context or commands. Generally, the implementation of touch, voice, tracking/perceptual, and kinetic UIs will be understood by those skilled in the art.

In touchscreen embodiments, the display controller 113 and/or the processor 102 may detect a touch by any suitable contact member on the touch-sensitive display interface 110 (references to the "display 110" herein include a touchscreen display, for those electronic devices implemented with touchscreen interfaces). The configuration of the touchscreen display and display controller for detecting touches will be known to those skilled in the art. As only one example, the touchscreen display may be a capacitive touchscreen display with a capacitive touch-sensitive overlay having multiple layers including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO). Optionally, haptic or tactile feedback can be provided by the haptics module 122 in response to detected touches received through the touchscreen display, either through the housing of the device 100, or through the touchscreen itself. The touchscreen sensors may be capable of detecting and supporting single-touch, multi-touch, or both single and multi-touch actions such as tap, double-tap, tap and hold, tap and drag, scroll, press, flick and pinch. A touchscreen enabled to detect only single-touch input is able to accurately identify only one point of contact on the display at a time. A multi-touch touchscreen is able to accurately identify two or more simultaneous contacts on the screen. The touchscreen display 110 detects these single and multi-touch actions, for example through the generation of a signal or signals in response to a detected contact, which may then be processed by the processor 102 or by an additional processor or processors in the device 100 to determine attributes of the touch event, such as the location of the touch action, whether defined by horizontal and vertical screen position data or other position data. The detected touch actions may then be correlated both to user commands and to an element or elements displayed on the display screen or view presented by the display 110. In response to the user command, the processor may take actions with respect to the identified element or elements. Touches that are capable of being detected may be made by various contact objects, such as thumbs, fingers, appendages, styli, pens, pointers and the like, although the selection of the appropriate contact object and its construction will depend on the type of touchscreen implemented on the device.

The orientation/INS module 124 can include one or more motion or tilt sensors capable of detecting gravity- or motion-induced forces to determine physical conditions of the device such as acceleration and angular velocity, which in turn can be used to determine the orientation or geometric attitude of the mobile device 100, or changes in orientation or attitude, in two or three dimensions. The orientation or attitude may be defined in absolute terms (i.e., based on a frame of reference external to the user's position or attitude), or terms relative to the user's position or attitude as may be detected by the electronic device 100 or based on default values. Motion sensors that may be provided in the orientation/INS module 124 include an accelerometer for detection of linear motion, and a gyroscope for detection of rotational motion. Accelerometers and gyroscopes suitable for use in handheld mobile devices 100 include the BMA150 digital 3-axis accelerometer, available from Bosch Sensortech GmbH, Reutlingen, Germany, and the MPU-3050 triple axis gyroscope available from InvenSense, Sunnyvale, Calif. These components may include integrated processors for processing signals generated by the accelerometer or gyroscope to compute motion data, thereby offloading motion algorithm computation from the host processor 102. The selection and implementation of suitable motion sensors will be understood by those skilled in the art. The orientation/INS module 124, if suitably equipped, may be used to detect changes in orientation of the device 100 between a landscape and portrait mode (i.e., a rotation of approximately 90 degrees, within a given tolerance range), or changes in orientation of the device in three-dimensional space; data obtained by the module 124 may also be used to detect movement of the device 100 in three-dimensional space, and to perform dead reckoning calculations to determine the position of the device 100 due to such movement.

The camera module 126a, 126b can include one or more lenses that focus light onto a photosensitive pixel array of an image sensor such as a charge coupled device or complementary metal oxide semiconductor image sensor. The image sensor receives radiant energy via the lenses and converts this energy to electronic signals that become a virtual representation of an optical image. The lenses and the pixel array form the optical setup of the camera module, which may be adjustable by, for example, adjusting distances between a lens and the image sensor or among lenses, or by replacing one set of lenses with another. The optical setup defines the current optical field of view of the camera module. The optical field of view is that part of the environment that is "visible" to the pixel array of the image sensor. The construction and configuration of the pixel array and image sensor and their integration within a mobile device 100 will be known to those skilled in the art. Data from the image sensor can be used to capture, by storage in a storage device of the mobile device 100 such as flash memory 108, still images and optically video. Further, the camera 126a or 126b may be used to display a "preview" image on the display 110 derived from the image data generated by the image sensor, which can be used to provide the user of the mobile device 100 with visual feedback as to what image data is currently being captured by the camera 126a, 126b without committing the image data to non-volatile memory. Although not shown in FIG. 1, the electronic device 100 may also include one or more proximity sensors which can be used to determine distance of the device 100 from a surface. An example of a proximity sensor is a radiation sensor for detecting reflected radiation, such as infrared light, from a nearby surface. Such a sensor may typically be used in conjunction with voice or video communication functions on the device 100 to determine when the user is present in front of or in close proximity to the display 110. The sensor may not necessarily be integrated with the camera 126a. Other suitable types of proximity sensors will be known to those skilled in the art.

Figure 2:
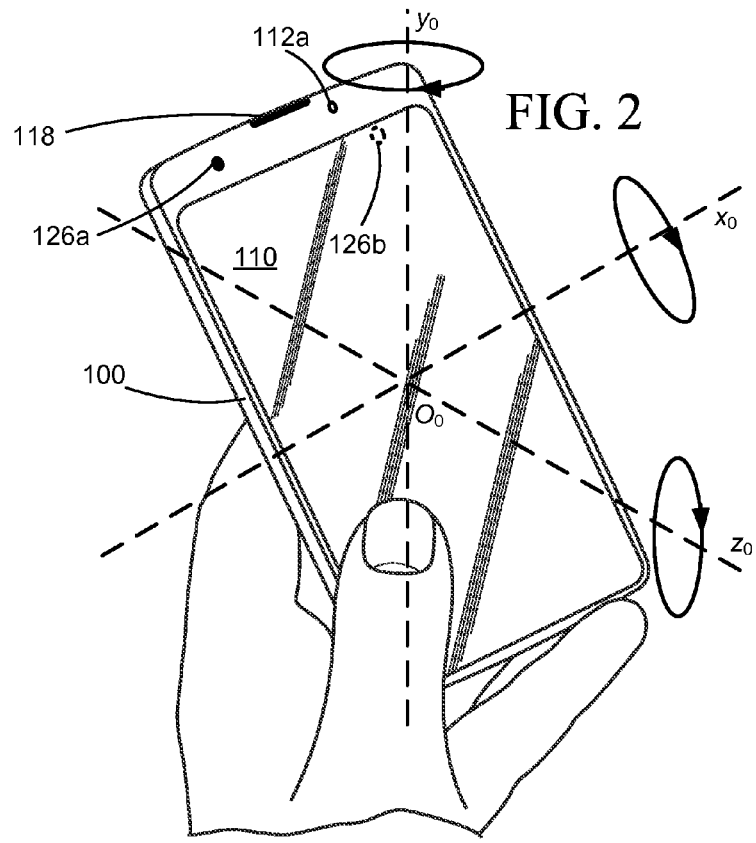
FIG. 2 is a schematic diagram of select components of the electronic device of FIG. 1.

FIG. 2 provides a perspective view of an example mobile device 100 having two cameras, one in a front-facing position 126a and the other in a rear-facing position 126b. In some examples, the mobile device 100 includes cameras in both positions. In other examples, only one camera in one position is provided. A front-facing camera 126a is disposed on the same face as the display 110, or at least generally faces the same direction as the display 110, thereby permitting the user to easily capture his or her own face and operate the device 100 via the display 110 at the same time when the device 100 is held normally in the user's hand, as illustrated in FIG. 2. A camera 126a in this position may be used to carry out communication functions such as video calling, in which contemporaneous image data of the user and sound data captured using the microphone 120 (not shown in FIG. 2) are transmitted to another party. A rear-facing camera 126b (shown in phantom) is typically disposed on a face opposite to the display 110, permitting the user to view a preview of captured image data on the display 110 while photographing or capturing video of a subject other than the user's own person. A speaker 118 and a light beacon (e.g., a light-emitting diode) 112a are also illustrated on the example device 100. While speakers 118 are common and often deemed necessary on mobile devices for the purpose of voice communication and audio playback (although speaker functions could be provided by a separate device, such as a Bluetooth handset, in communication with the mobile device 100), the light beacon 112a may be considered to be optional but is useful for communicating a status of the device 100 to the user; for example, the beacon 112a could flash in a particular pattern or color when a message is received. Other UI mechanisms can be provided on the mobile device 100 of FIG. 2, but are not illustrated.

FIG. 2 also illustrates a reference set of three-dimensional axes $x_o$, $y_o$, $z_o$ with the mobile device 100 at the reference (origin) point $O_o$. The device's detected rotation around these axes, which define a frame of reference, can be used to define the attitude of the device (e.g., pitch, roll and yaw) with reference to a default attitude (which, in one non-limiting example, may be the attitude illustrated in FIG. 2 when the device 100 is at rest in the user's hand in a typical "in-use" position when the user holds the device for the purpose of operation using his or her hands, or in another non-limiting example could be a prone position, as though the device 100 were lying face up on a horizontal surface). Similarly, the detection of a translation of the device 100 within the frame of reference (e.g., linear motion) may be defined in terms of the device's position with respect to these axes. While a Cartesian coordinate system is suggested by the accompanying figures, this is by no means the only coordinate system that can be applied. Rectangular, polar, or other coordinate systems may be applied as appropriate.

A typical end-user computing environment includes mobile electronic devices of the general type described above, as well as personal computers of varying form factors. In such environments, the management of data items—their creation and storage, organization, and retrieval—remains largely silo-driven or compartmentalized. For example, the storage of data items tends to be compartmentalized on a program-by-program or by-type basis. Email messages are received and created by an email messaging application 152 executing at a mobile device 100, and are stored by the email messaging application in an associated email data store at the mobile device 100; other types of messages are stored in data stores associated with those other message types, or associated with specific messaging applications. A media player application 170 is required to play multimedia files. "To do" lists—notes created by the user to memorialize outstanding tasks—can be created by a variety of applications, including dedicated "shopping list" applications, memo applications 168, calendar applications 160, notepad or sketchbook applications, word processors, dictation applications and even messaging applications or other applications that permit the user to input verbal content (whether by speech recognition, touch/gesture, text input by keyboard, or some other UI mechanism). "Data items" can range from messages, to calendar events, tasks, and other personal information, to documents of various types, and include discrete files or data structures maintained in device storage or temporary memory, as well as individual records or fields comprising a unit of information intended for user consumption. For example, a word processing document or slide presentation document is typically stored as a discrete, single file, whereas a set of individual electronic messages are often stored in a single file or database, such as a mailbox file or conversation, although individual messages may be extracted.

Since storage of these various data items is often application-specific or file type-specific, organization of the data items often tends to follow the same philosophy. For example, the user may dictate a memo that is stored by a memo application 168 in an audio format, and decide, for document management or searching purposes, that the memo should be tagged with a particular label or category, such as "work", "personal", "groceries", or a project name. If this attribute value (e.g., attribute="category" and value="work") was not defined at the time the memo was created, the user must then reopen the memo using the memo application 168 and invoke an editing function in that application to alter the metadata associated with the data item to add this attribute value, or edit a pre-existing value for that attribute. Where the operating system 140 or permission attached to individual data items permits, the user may be able to alter the characteristics (such as attributes and corresponding values) of the data item using an operating system function or application other than the one used to obtain (e.g., download or create) the data item. However, this more likely to be an option with computing devices such as desktop computers and laptop computers having operating systems granting the user and other applications sufficient access to the operating system's file system. In a mobile computing environment some or all of the file system may be "locked down" so that it is not typically accessible in this manner. On a smartphone or tablet, a particular data item or aggregation of data items, such as a message inbox, typically must be accessed using the application that created or received the data item.

In addition, the user's interaction with data items for the purpose of organization is usually constrained to implementations involving user interface mechanisms supporting the presentation of text or visual content to the user. This is not surprising, since text and graphics are primary modes of communication between the user and the mobile device. Tags or categories of data items are often expressed in text, or at least visually (for example as colors or icons). Optionally, a two-dimensional rendering might illustrate the relationship between individual data items or groups of data items. An example of this type of two-dimensional rendering includes a message inbox listing that can be visually divided into listings of messages received "today", "yesterday", "last week", and "earlier". The juxtaposition of these listings illustrates a relationship between the listings of messages based on a temporal characteristic. A more abstract rendering might involve the display of a number of folders of different colors or with different names on a virtual desktop, with each folder containing data items relating to a different project. In any case, for the organization scheme to be effective, the user must remember the relationship between the text name or category, the color, or other indicator, and the type or content of the associated data items.

However, visual or textual indicators are not the only means by which humans can organize information or recall associations between data items or even physical objects. For example, spatial relationships between objects (virtual or physical), and spatial relationships between objects and the user, can also be used for organization. In the physical world, a user might place paper files representing more urgent matters closer to him on his desk, while less urgent matters are placed on a more distant side table; the user understands that those items closer to him require attention first, so the relative position of the physical items denotes a relative value of certain attribute (a due date, urgency or importance) as compared to other physical items.

Positions of physical items can also imply that the physical item has an attribute that might not be inherent to the item (an "inherent" attribute can be one that is expressly defined within the item or in association with it, such as a due date, sender identity, subject line, etc.). A document or paper file may not be urgent or even have an associated due date or event, but it may be of general interest and the user may wish to have it nearby in a pile of "someday" items, or in a stack of reading material that he might peruse when he has free time. The various items in this physical stack may not themselves be related to each other by content, but they share a common attribute that is not inherent in the items themselves, in that they are of continuing general interest to the user. Of course, these "someday" items may be subdivided into categories based on subject matter or other inherent attributes.

The position of a physical item in relation to another can also serve as a reminder, because the physical item is proximate to a task or item currently holding the user's attention. An example is the user at home in the evening, placing lettermail to be posted by his house keys on a front hall table; the next morning, the user will hopefully see the lettermail and remember to take it with him when he leaves for the office (since the user would typically take the house keys when leaving home). Another example is the placement of notes (e.g., sticky notes) on the edge of a computer monitor; the notes are located in an area that usually attracts the user's visual attention, and are easy to locate and read. The user may train himself to look to these locations for reminders, and may come to mentally associate physical locations about his person with different types of reminders, even without reference to external physical triggers or locations. For example, the user might organize work-related notes and reminders on his left-hand side, and personal notes and reminders on his right. The allocation of different types of notes to different locations may arise from a physical association (the user's work computer might be positioned to the left of the user's seat at his desk, while the office door is off to the right), but ultimately the user's mind could be conditioned to associate particular directions or areas around his person with different subject matter.

As is apparent from the above examples, the spatial relationships amongst items and between items and the user can be three-dimensional, and these spatial relationships may represent attributes of the data items; but as explained previously, in a typical (particularly mobile) computing environment, the management of data items and the assignment of attributes to data items are often limited to the visual and textual user interfaces typically provided on the computing device. However, since modern mobile computing devices may be provided with one or more non-visual and non-textual UI mechanisms such as the aforementioned kinetic and tracking UIs, one or both of these UI mechanisms can be used to provide a spatial aspect to the management of data items at a mobile device.

Figure 3:
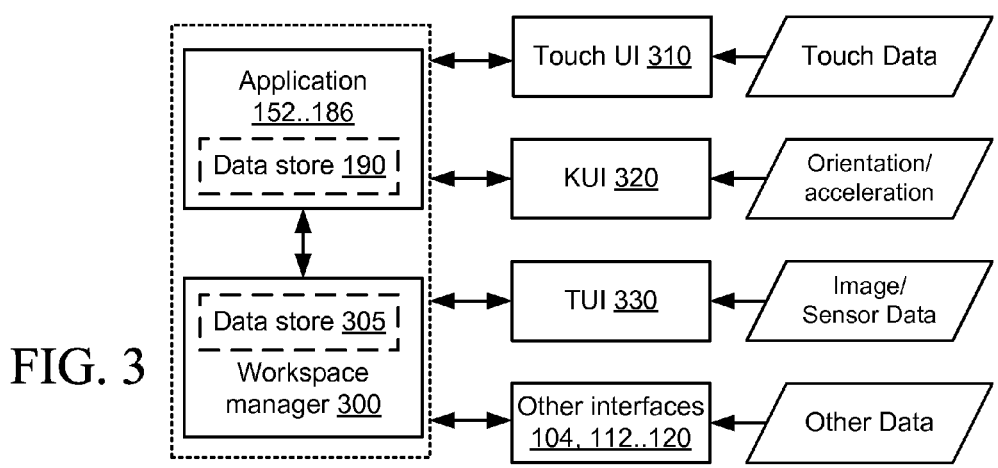
FIG. 3 is a perspective view of an example smartphone or tablet computing device in accordance with FIGS. 1 and 2 including a front-facing camera.

Turning to FIG. 3, a schematic diagram showing select components of the mobile device 100 and their interrelationship is provided. Input raw data, which can be in the form of user input touchscreen data signals, orientation and/or acceleration, velocity data, image data, and so on, are collected and processed by various interface modules such as a touch UI 310, kinetic UI 320, and tracking UI 330, respectively. In this example, the blocks representing the various UIs includes those components of the mobile device 100, which can include physical components such as processors and specialized circuits or other devices, that interpret input data (such as those illustrated in FIG. 3) and generate output signals that are subsequently used by applications or the workspace manager 300 discussed below. The touch UI 310, kinetic UI 320, and tracking UI 330 in some examples can be considered to include the physical sensors or data collection mechanisms such as the touchscreen display 110, the orientation or INS module 124, and the one or more cameras, 126a, 126b. Data may also be obtained from other interfaces 104, 112 ... 120; such interfaces can include pointing devices (such as a trackball or trackpad), keyboards 116, and the like. The data processed by these various UIs may result in the identification of specific instructions or "events" that are then output for receipt by applications or the workspace manager 300: a sequence of contacts detected by the touchscreen display 110, for example, may be converted by the touch UI 310 to a gesture, which is then output to a process (such as the operating system or to an executing application such as the browser 164) to interpret as (for example) a "scroll" or "zoom" instruction, or a "touchmove" event. The touch UI 310 could instead directly convert the detected contacts to a particular instruction or event, and feed this instruction or event to the relevant process. The kinetic UI 320 may identify a motion (with a magnitude and/or direction) due to a detected movement or detected change in the position of the mobile device. The detected motion (e.g. a computed velocity or an acceleration) may be passed to the appropriate process, or alternatively the kinetic UI 320 may convert the detected motion to a particular UI event or instruction, and pass this event or instruction to the appropriate process. The tracking UI 330 may similarly identify a motion, with a magnitude and/or direction, due to a change in a position of an object (e.g., the user's face) in a sequence of images captured by the camera 126a or 126b or from data received from a proximity sensor, and pass the computed motion (e.g. a computed velocity) or an event or instruction derived from the computed motion to the appropriate process.

The data output from the UI 310, 320, 330, etc.—the detected or computed motion or gesture data, for example, or the interpreted instructions or events—may be passed directly to an executing application 152 . . . 186 (each of which may have a corresponding data store 190), which then acts on the received input. In other cases the output from the UI is not directly passed to the application, but the application may instead listen for data reported by the UI. For example, the kinetic UI 320 can convert raw acceleration data to determine the current orientation of the mobile device in space, and periodically update a status for the current device orientation that is stored in memory at the mobile device 100; this status can then be accessed as required by an executing process on the device 100.

In some examples, the data processed by the various UIs is not passed directly to the application 152 . . . 186 (or, the application 152 . . . 186 does not necessarily listen for detected UI events). Instead, the data is provided to an intermediate component, illustrated FIG. 3 as a "workspace manager" 300. The workspace manager 300 obtains orientation or position data, or events from one or more UIs 310, 320, 330, 104, 112 . . . 120, processes these events, and implements instructions based on the processed events, or passes instructions to one or more of the applications 152 . . . 186 as described below. In the example illustrated in FIG. 3, the workspace manager 300 is a module that can operate as an intermediary between the applications 152 . . . 186, and one or more of the UIs 310, 320, 330, and in particular the kinetic UI 320 and/or tracking UI 330, in which case the workspace manager 300, receives the data output by the UI and processes it accordingly on behalf of the application. In other examples, the workspace manager 300 is integrated within an application, so the workspace manager functions described herein are therefore implemented by the executing application. In still other examples, not illustrated, the workspace manager 300 is integrated within an individual UI, such as the kinetic UI 320 or the tracking UI 330; thus the UI functions and the workspace manager functions are implemented by the same module. In addition, the workspace manager 300 (however it is implemented) may be provided with its own data store 305, which is used to store information obtained from the various UIs in relation to specific data items, also as described below.

Figure 4A:
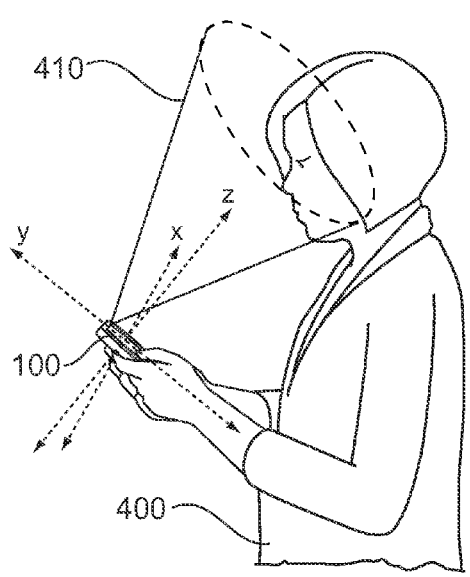
FIGS. 4A and 4B are a perspective view of a user holding the device of FIG. 3, and a corresponding view of visual data received using the camera.

FIGS. 4A to 5B illustrate example input that may be received via the kinetic or tracking UIs 320, 330 for use by an application or the workspace manager 300. FIG. 4A illustrates a typical "in-use" stance of a user 400 holding a mobile device 100 and looking at the device's display 110. The position of the mobile device 100 with respect to the user 400 is highly dependent on a number of factors, such as the user's anatomy (e.g., length of the user's arms); any mobility or vision impairment; the size of the device display 110; the size of the text or other content displayed on the display 110; whether the user is standing, sitting, or reclining; or lighting conditions. In typical conditions and in a typical stance, however, the user may tend to hold the device at a particular angle with respect to his torso with a pitch of approximately zero degrees (i.e., around the y-axis), and a particular distance away, within certain defined tolerances of position or angle. The position of the device 100, within these tolerances, may be considered to be a "home" position for the device 100 when the device is in use while being held by the user 400. This "home" position may therefore be a region of space surrounding the position of the mobile device 100 illustrated in FIG. 4A.

Optionally, the attitude of the mobile device 100 in the home position (as represented by the orientation of the x, y, z axes in FIG. 4A) may be determined using the orientation/INS module 124 provided on the mobile device 100. This attitude data may be provided to the kinetic UI 320 to process as a UI event, and this event (or the attitude data itself) provided in turn to the workspace manager 300 or application 152 . . . 186. In addition to this attitude data, or in place of this data if the orientation/INS module 124 is not present or not capable of providing this data, position information for the mobile device 100 may be derived from camera image data obtained by the tracking UI 330 using input from one or more input devices, such as a proximity sensor or the front-facing camera 126a (or the rear-facing camera 126b, if that camera is facing the user). For example, when the input device is the front-facing camera 126a, the optical field of view as illustrated by the field of view cone 410 in FIG. 4A of the camera 126a, at a normal (100%) zoom level, may include some part of the user 400's anatomy, and in most cases will include the user's head.

Figure 5A:
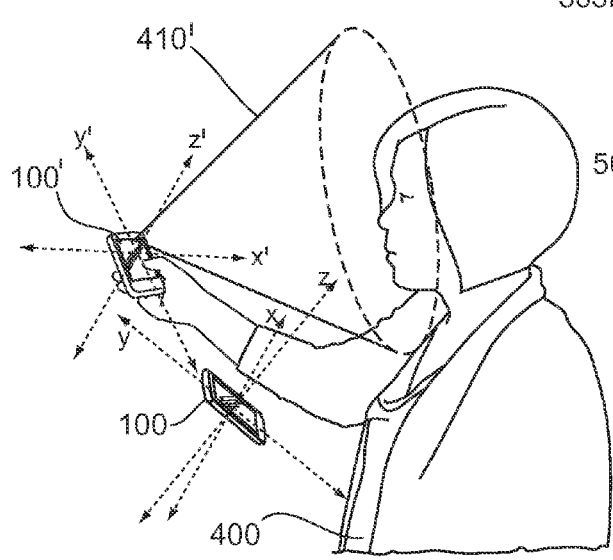
FIGS. 5A and 5B are a further perspective view of the user holding the device of FIG. 3 in a different position, and a corresponding view of visual data received using the camera.

A possible field of view is illustrated in the image representation 400 of FIG. 5A. It will be appreciated that the optical field of view of the camera 126a may in fact extend beyond the bounds of the image 500, since the image 500 is rectangular and the field of view may not be; however, when sensor data is converted to data for display or storage at the mobile device 100, the field of view is truncated as appropriate to produce the image. In this example, the image 500 includes a view of the user's head 510 in a lower portion of the field of view. If the image 500 is notionally divided into an array of subfields 505a . . . h, it can be seen that when the mobile device 100 in this particular example is in the home position, the camera's field of view is oriented such that the user's head 510 principally occupies the lower half of the image, namely subfields 505c, 505d, 505g and 505h. The user's head also spans a height roughly equal to the height of half the image.

The tracking UI 330, operating in conjunction with the workspace manager 300, can then use the image data from the camera 126a to determine and store data defining the home position of the device 100 for later reference, as discussed below. For example, face- and object-recognition algorithms for identifying the position of facial features or objects in an image, and for recognizing and matching facial features or objects against stored data representations of such features and objects, are known in the art. A face or object recognition algorithm could be executed on the image data received by the camera 126a or 126b to identify a position and relative dimensions of the user's head or face within the image 500, and the position and dimensions can then be associated with a particular position of the mobile device 100 with respect to the user. The recognition algorithm may be implemented by the tracking UI 330, the workspace manager 300, or by another component of the mobile device 100.

When the user 400, still holding the mobile device 100, moves the device to a different location, new position and attitude data may be collected. An example is shown in FIG. 5A, in which the mobile device (now indicated as 100') has been moved to a position further away from the user 400's head and off to the user's right side, with the front face (i.e., the face including the display 110 and the front-facing camera 126a) still generally oriented towards the user 400. The new device attitude is reflected by the orientation of the x', y', z' axes, which has changed from the original attitude reflected by the original x, y, z orientation of the mobile device 100 (shown in phantom in FIG. 5A). Moreover, the position of the mobile device 100' reflects a translation in three-dimensional space from the original position of the device 100. The shift in position and/or the attitude may be detected by the orientation/INS module 124, and this data may be passed to the kinetic UI 320 to determine a current position of the device determined relative to its previous position in FIG. 4A, or to interpret the detected movement as an event.

In addition, the tracking UI 330 can again obtain data from one or more input devices, such as the cameras 126a, 126b and/or proximity sensors, to assist in determining a current position of the mobile device 100 (100') with reference to the user. As shown by the field of view cone 410' in FIG. 5A, the optical field of view of the camera 126a may still include part of the user 400's anatomy, but the angle of incidence on the user will be different than the example of FIG. 4A. FIG. 5B illustrates a possible image representation 500' of the data obtained by the camera 126a. In this case, the user's head 510' is no longer substantially positioned in the lower half of the field of view; rather, the user's head is positioned towards one side of the field, mainly in subfields 505b and 505c. As well, since the mobile device 100' is now positioned farther away from the user's head, the representation of the user's head in the image 500' spans less than half the image height at the same zoom level as in the image 500. Again, using the face- or object-recognition algorithm, the position and relative size of the user's face can be redetermined. This redetermined position and size data can be compared to previously obtained position and size data to infer the new position of the device 100' with respect to the user 400, for example by determining an approximate transformation of the recognized object for correlation to a change in distance and angle of the device with respect to the object. Generally, following the examples of FIGS. 4A to 5B, an increase in the relative size of the user's head in the image 500, 500' represents a movement of the device to a position closer to the user's body (and, specifically, the user's head); a shift of the position of the user's head to the left of the image corresponds to a movement of the device to a position to the right of the user's head, and vice versa; and a shift of the position of the center point of the user's head upwards within the image corresponds to a movement of the device upwards relative to the user's head. The differences between the detected facial features or other objects in the image can be used by the tracking UI 330 or another module of the device 100 to compute a new position of the mobile device 100 with respect to the user 400.

It will be understood by those skilled in the art that it is not mandatory that the movement of the device 100 be tracked or monitored in real time as the device is in motion. In the case where the tracking UI 330 is used to determine the position and/or attitude of the device 100 with respect to the user, for instance, a determination of device position may be made based on only image data captured at the destination position, i.e. once the user has moved the device to the desired location. This image data can be compared with previously captured data to determine the current position of the device 100, for example by determining a transformation from position data obtained when the device was in a home position. Alternatively, the captured image data can be compared to one or more previously stored sets of data associating object (face) positions with specific positions around the user. These sets of data may be obtained during a calibration mode of the tracking UI 330, during which the user holds the device 100 in various predefined positions around himself and the tracking UI 330 obtains image and/or proximity data, which is then stored in association with those positions. Subsequently, a best match is identified for the captured image data against this previously stored data, and the tracking UI 330 or workspace manager 300 then defines the current position of the device 100 based on the best match.

The mobile device 100 can therefore use input data from various sensors (including the camera 126a or 126b), independently to determine a current position of the mobile device 100 with respect to the user 400, and/or changes to the position of the mobile device with respect to the user. Kinetic and/or attitude data collected by the orientation/INS module 124 may be used in combination with image data collected by the camera 126a or 126b to confirm or to improve the accuracy of the calculated position of the mobile device 100. Given that the user 400 is theoretically able to hold the mobile device 100 and move it to any position within the user's arm's reach, a region of physical space can be defined around the user 400 in fixed relation to the user's position and orientation (i.e., the direction in which the user is facing), and a position of the mobile device 100 within that space can be determined using sensor data. This is distinguishable from the use of GPS or other location tracking technology to determine a geographic position of the mobile device 100; GPS and similar location data can be used to detect an approximate terrestrial position of the device 100, and infer the terrestrial location of the user based on the assumption that the user is in the same location as the device 100. This is also distinguishable from typical uses of mobile device UIs in augmented reality applications, in which the mobile device 100 is used to collect and present information about objects or landmarks in the user's surroundings. In these augmented reality applications, the mobile device 100 is used to identify an object or landmark, for example via the rear-facing camera 126b or a wireless communication subsystem 104a . . . n (such as a near-field communication module), or by a combination of GPS data and attitude data received from the orientation/INS module 124, while the user observes data presented on the display 110 relating to that object or landmark. In contrast to these GPS-assisted or augmented reality scenarios, in these examples the mobile device's kinetic UI 320 and tracking UI 330 and related data are used to determine the position of the device in a physical region fixed with respect to the user 400, without reference to the terrestrial location of either the mobile device 100 or user and without reference to any external object or landmark.

Figure 6:
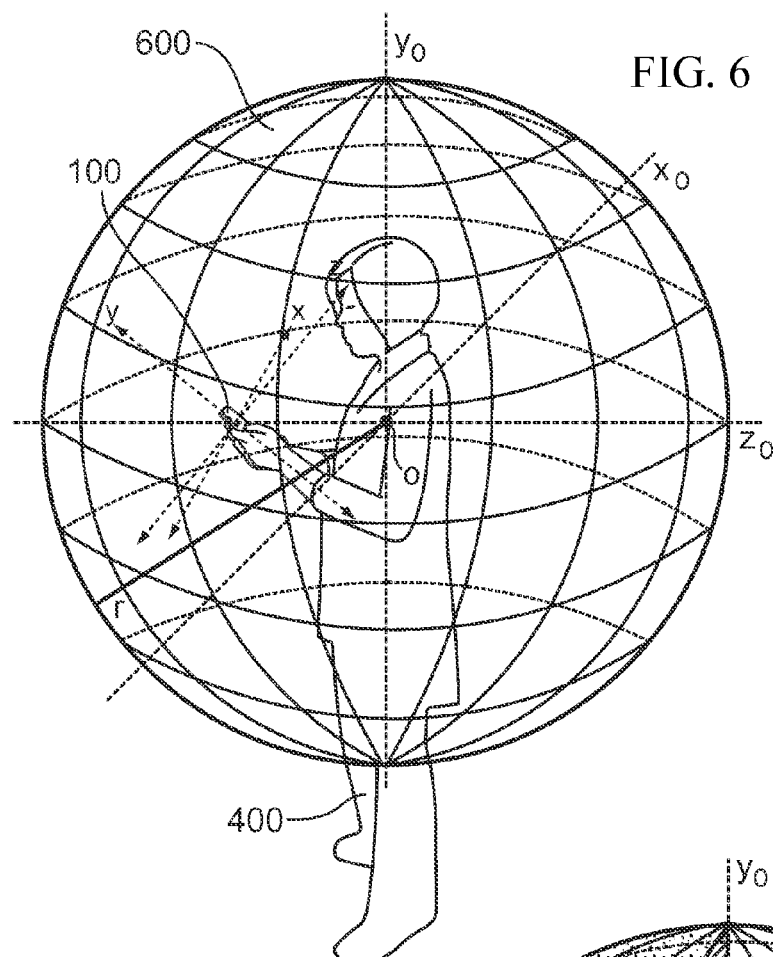
FIG. 6 is a perspective view of a physical region around a user holding the device of FIG. 3.

The physical region that can be defined around the user 400 is illustrated in FIG. 6. In FIG. 6, the physical region 600 is illustrated as a sphere in fixed relation to the user, with the user's chest (approximately at the height of the mobile device 100 when in the home position) at the sphere's center or origin point O. The center or origin point of the physical region 600 need not be positioned on an axis of the user's body as illustrated in FIG. 6, but may instead be positioned according to another reference point defined with respect to the user. For example, the "home" position of the mobile device 100 described above, being the typical location with respect to the user when the device is in normal use, is offset from the origin O of the physical region 600, but this is not mandatory. The origin point and the home position of the mobile device 100 may be coincident instead. Whether coincident or not, the home position and the origin point are generally expected to remain in substantially fixed geometric relation to each other. Once the home position of the device 100 is determined, if the origin point and home position are not defined as coincident, the origin point can be inferred using ergonomic data relating the typical position of the mobile device 100 to the user's body or head.

The shape of the physical region 600 need not be spherical as illustrated in FIG. 6, nor need it be symmetric. Further, the user typically cannot reach in all directions behind him, so in some cases it is not necessary for the representation of the physical region 600 to include that those portions of the sphere. The physical region 600 could also be represented by a generally rectangular box immediately in front of the user 400, by a hemisphere with its plane centered at the user's midpoint, and so on. It is expected, although not mandatory, that the breadth and/or depth of the physical region 600 are determined by the extent of the user's reach while holding the mobile device 100. For example, the physical region 600 may have a depth or radius of approximately 2 to 3 feet (60 to 90 cm). However, in some examples, the physical region 600 can include those regions of physical space around the user that are actually outside the user's reach.

Although the physical region 600 might be considered "virtual" in the sense that it is intangible and its definition is stored in memory at the mobile device 100 or at another data repository, the physical region 600 does have a physical rather than virtual existence since its position and orientation is fixed with reference to the user: it is that "bubble" (or other three-dimensional region) of physical space proximate to or surrounding the user in which the mobile device 100 can physically reside while still being held by the user or under the user's manual control. Further, the mobile device 100's position within the physical region 600 is determined using physical data, whether in the form of acceleration and/or attitude data obtained using the orientation/INS module 124, or image data, or other inputs received by a kinetic or tracking UI 320, 330 to determine the position of the mobile device 100 in absolute terms with respect to the user or inferentially using dead reckoning.

Figure 7A:
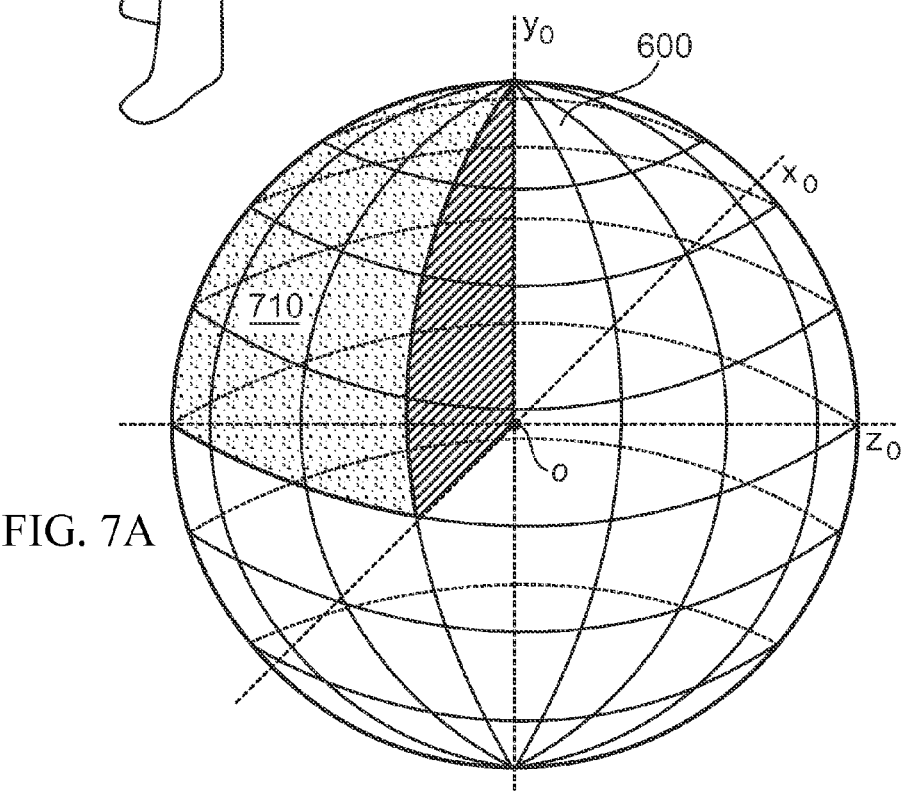
FIGS. 7A to 7C are perspective views of the physical region of FIG. 6 and sections thereof.
Figure 7B:
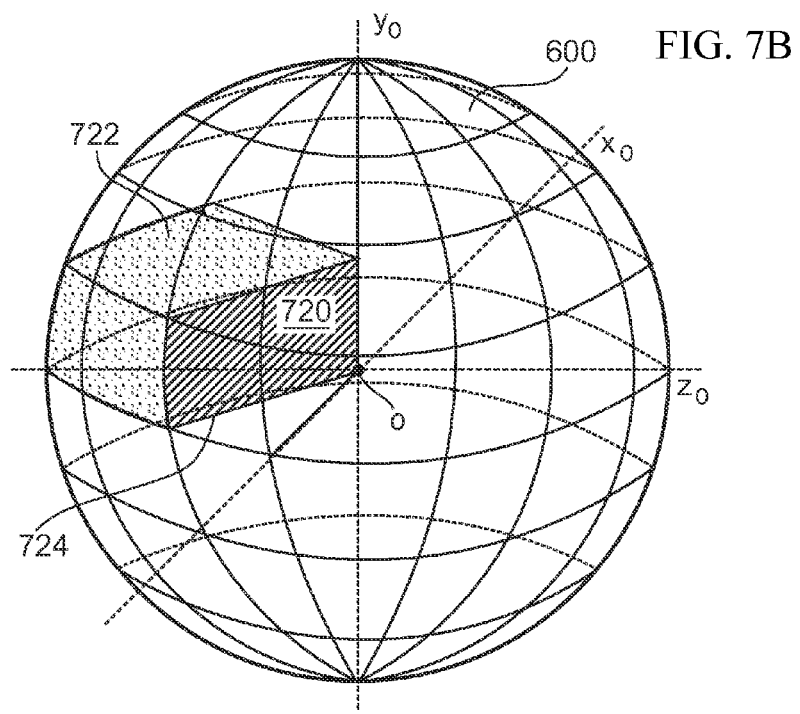
Figure 7C:
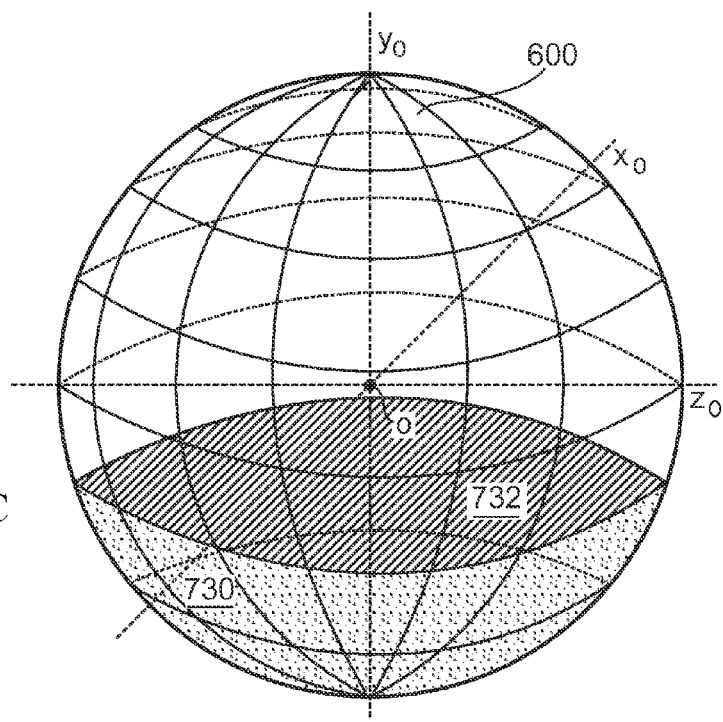

The physical region 600 may have a "virtual" representation on the mobile device 100 if a visual projection is displayed on the display screen 110, and the use of the physical region 600 can also be considered to have virtual connotations, since the physical region 600 can be conceptualized as a set of virtual "shelves", "cubbyholes", "bulletin boards", and so on, for the organization of data items. The schematic of the physical region 600 shown in FIG. 7A depicts one subregion 710 of the physical region 600, in this case an upper half of a spherical wedge extending from the origin point O to the left and above the origin. This may be considered to be the upper left-hand quadrant of the physical region 600 facing the user 400. FIGS. 7B and 7C illustrate other possible subregions within the physical region 600. In FIG. 7B, a segment 720 of the physical region 600 is depicted, bounded between two horizontal planes 722 and 724 (the latter on the underside of the segment 720) and extending from the origin O outwardly and to the left of the user. The segment 720 may be conceived as a "shelf", and could extend across the width of the hemisphere of the physical region 600 positioned in front of the user, or across the entire width of the physical region 600. Additional subregions may be positioned above and below the segment 720, extending the "shelf" metaphor. FIG. 7C illustrates a cap subregion 730 of the spherical physical region 600, representing the lower reach of the physical region 600 within the user's reach while holding the mobile device 100. The upper bound of this subregion 730, defined by a horizontal plane 732, could correspond with roughly the wrist height of the user 400 when the user's arm is relaxed and hanging down.

The subregions 710, 720, 730 illustrated in FIGS. 7A to 7C are subregions of a regular solid shape. As noted above, the physical region 600 need not be restricted to a sphere, and indeed need not be restricted to a regular solid, but can instead be irregular. The subregions 710, 720, 730, and any other subregions of the physical region 600 can also be irregular.

Various locations within the physical region 600 may be associated with different data item attributes and attribute values. The location may be a pinpoint location (i.e., a single point in the physical region 600), or a subregion such as 710, 720, 730. The attribute may be a topical attribute, such as the "category" attribute mentioned above (which may also be referred to as a "tag" or "label"). One or more values may be assigned to a topical attribute for a given data item, either manually (i.e., in response to an express instruction for that data item) or automatically (e.g., by operation of a rule based on other attributes or characteristics of the data item). An example of a topical attribute value may be a keyword denoting the general relevance or purpose of the data item (e.g., "work", "recipe", "groceries"), or a keyword denoting the subject matter of the data item as might be determined from the data item content, which could include the subject line, if the data item were a message or message thread having a subject line.

An attribute may be a temporal attribute, such as a file creation date, a due date, a sent or received date (particularly in the case of a message), a duration, time elapsed, or time to elapse before the occurrence of an event. An example of a temporal attribute value is thus a timestamp (which can include an indication of a date). Still another example of an attribute is a sharing or permissions attribute, which defines individual users or groups having access to a particular data item. An example of a permissions attribute value is a discrete username (such as the user's own username, or the "administrator" username), a discrete user group name, or the designation "public" or "all".

A single data item can have more than one of a given type of attribute; a calendar event, for example, will likely have at least a due date and either a time elapsed or end date attribute, all of which are temporal attributes. Different types of data items can have different attributes, or share the same attributes. Table 1 below provides list of example attribute types that are commonly attributed to different data item types associated with various applications:

TABLE 1

Examples of data items and possible attribute types

| Application Type | Data Items | Attribute Types |
|---|---|---|
| Calendar | Meeting invitations, appointments | Temporal, topical, participant |
| Task | Task items | Temporal, topical, participant |
| Memo | Voice files, text files | Temporal, topical, sharing |
| Messaging | email, instant message (IM), short message (SMS), voicemail | Temporal, topical, participant, importance |
| Camera | Photos, videos | Topical, sharing, GPS |
| Media player | music files, podcasts, radio stations | Topical, playlists |
| Browser | Webpages, bookmarks | Topical |
| Word processor | Text files, word processor files | Topical, sharing, temporal |
| File Sharing | Any file type | Topical, sharing, upload/download |

The lists of application types, possible associated data items, and possible associated attribute types are, of course, not exhaustive. The contents of the table are only intended to provide examples of attributes that may be commonly referred to; for example, many data items are stored with a creation date included in the data item metadata, so "temporal" is an attribute type that could likely be associated with any one of the data item types listed in Table 1, but it is more likely to be used to reference a calendar or task data item than a music file. Other attribute types include the participant attribute (e.g., the sender and/or recipient of a message, and the organizer and/or attendee/invitee of a meeting, with values based on the participant's name or address/domain); the importance (or priority) attribute, which takes on a value indicating the data item's relative importance (e.g., high importance, normal, low importance); the GPS attribute (e.g., a designation of geographic location associated with the photo, which may be determined using the mobile device's GPS module 123 at the time the photo is taken with the camera 126*a* or 126*b*); a playlist attribute, identifying membership of the data item in a particular grouping or list of like data items for playback; and an upload/download status attribute, identifying whether a file was downloaded and optionally from what source or network, or whether the file is designated by the user for upload the next time the file sharing application 184 connects to a suitable network. Other attribute types, data item types, and application types will of course be known to those skilled in the art.

Some of these attributes are of the type for which values are automatically generated upon creation of the data item, inasmuch as they are derived from typical metadata created at the same time as the data item and the possession of those attributes is a necessary requirement of the data item. A meeting invitation, for example, has both temporal and participant attributes, and the values for those attributes are determined from the data entered by the user creating the meeting invitation. Many attributes are static, in that their values are determined once (e.g., on creation) and change only in response to an express instruction. An email message data item, for example, has static participant values, since the sender and recipients for a received message are unchanging. The topical attribute value of a memo or word processing file, however, may change if the user decides to change that value. Some attributes are dynamic, in that their values change automatically based on other factors that spontaneously change. The time elapsed for a task, or the time to elapse before the start of a calendar event, are dependent on the start time (a static temporal attribute value) and the current time (a dynamic value, since it spontaneously changes). Further, it may be noted that the data item type—the fact that a data item is a task, memo, photo, text file, and so forth, as may be determined by characteristics of the data item itself—is also an attribute in itself. The association of a particular attribute to a data item and the assignment of a value to the attribute may be referred to as a "characteristic" of the data item.

Any one of these attributes could be used to organize data items, and any one of the attributes and/or values could be associated with a location in the physical space 600. The first subregion 710 shown in FIG. 7A, for instance, may be associated with a topical attribute such as a "tag", and specifically with those data items having a tag attribute with a value of "work". Another subregion may be associated with data items with an "urgent" characteristic, such as those data items that have a temporal attribute value specifying a due date equal to the current date. "Urgent" may also (or instead) include those data items having an importance attribute value indicating that the data item is highly important. Still another subregion may be associated with a value of the file type attribute, such as all email messages or all word processor files. Another example of a data item characteristic is a "discard" or "trash" label, which may be applied to any data item that the user wishes to discard. A particular subregion of the physical space 600, for example the lower region 730 of FIG. 7C, could be associated with such a characteristic.

Any location can therefore be associated with any data item characteristic. A given location may be associated with multiple data item characteristics, and single data item may have multiple characteristics. Thus, a data item can be associated with a given location (e.g., a subregion) by virtue of the data item's characteristics, and accordingly the data item will be associated with the location in the physical space 600 defined for that subregion. Conversely, if a data item is associated with a particular location in the physical space 600, it can be determined that the data item has a particular characteristic if that characteristic is associated with that location in the physical space 600.

Figures 8, 9A, 9B:
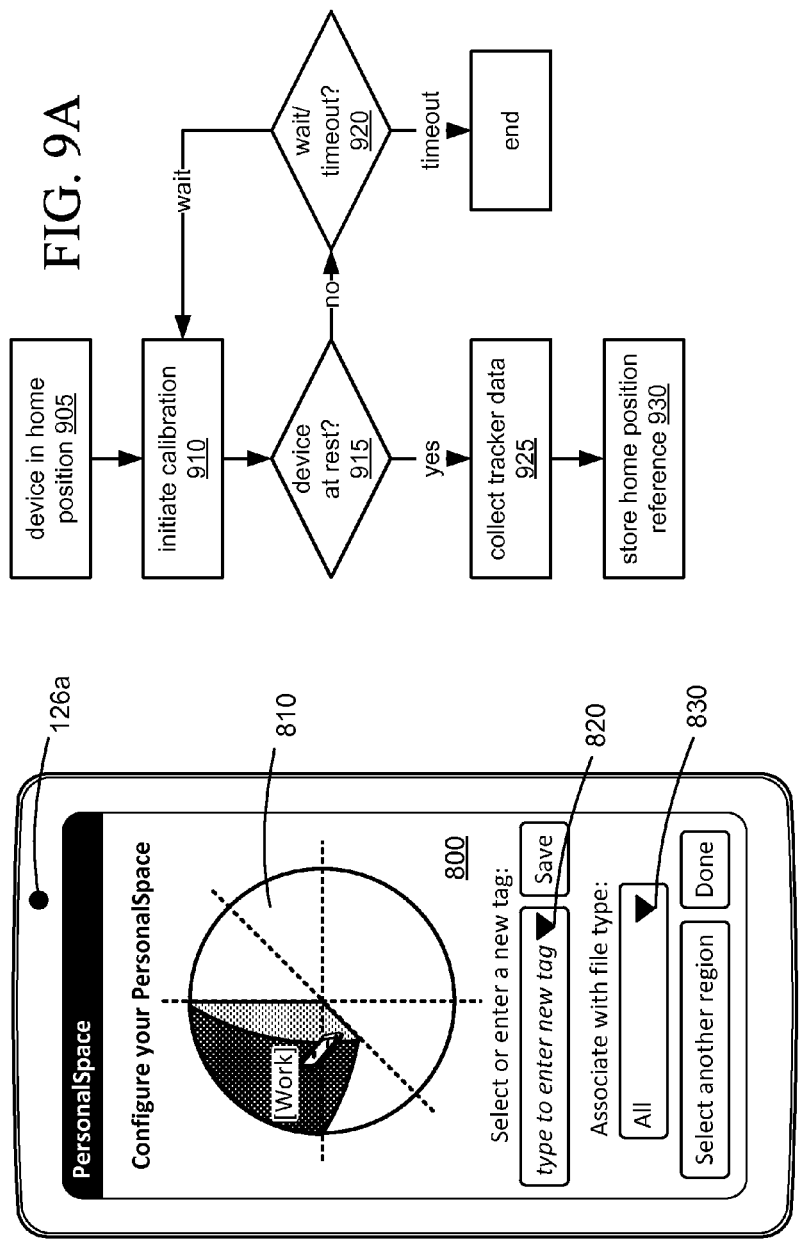
FIG. 8 is an illustration of an example graphical user interface for configuring a virtual workspace within the physical region of FIG. 6.
FIG. 9A is a flowchart illustrating a method for defining a home position of the electronic device in the physical region.
FIG. 9B is a flowchart illustrating a method for associating a category or data type with a defined region in the physical space.

The allocation of a particular data item characteristic to a given region in the physical space 600 may be carried out in response to a user command, received using any appropriate UI means. An example is shown in FIG. 8. FIG. 8 illustrates an example view 800 displayed on a mobile device display containing a two-dimensional projection 810 of the physical space 600 in which a subregion of the physical space 600 can be defined and selected, and including one or more UI elements 820, 830 for selection or entry of a data item characteristic to be associated with the selected subregion. In the example of FIG. 8, the first UI element 820 permits selection or entry of a new "tag" attribute value, and the second UI element 830 permits selection of a file type to be associated with the subregion. One or both of these UI elements 820, 830 may be used to configure the selected subregion. FIG. 8 provides a graphical user interface method of associating a data item characteristic to a subregion of the physical space 600, but other UI techniques can be used, including a speech interface, tracking UI 330, or kinetic UI 320. The association of the data item characteristic to the subregion may thus operate as a rule that is executed on any new data items detected at the mobile device 100. The associations between the data item characteristics and the subregions, as well as the definitions of the subregions within the physical space 600, may be generated by the workspace manager 300 based on input received from the various UIs (in which case the view 800 may be a view associated with the workspace manager 300), and stored in the workspace manager data store 305.

These various locations in the physical space 600 are defined with reference to the origin O of the physical space discussed above. FIG. 9A depicts an example of a possible method for the definition of the home location, and inferentially the origin position of the physical space 600, by the workspace manager 300. At FIG. 905, the mobile device 100 starts at the home position. When the home position for the mobile device 100 is defined for the first time, the mobile device 100 cannot determine that it is in the "proper" home location; rather, the home position is deemed to be whatever the current position of the mobile device 100 is. Thus, when the user initially defines the home position, the mobile device 100 may display or otherwise present instructions for the user to follow (e.g., instructions to the user to hold the device in their normal in-use position, and how to initiate the calibration of the device).

At 910, calibration of the mobile device 100 with respect to the home location is initiated. This initiation may start in response to a user input indicating that the mobile device 100 is currently being held in the home position (e.g., an input button press or touchscreen event, or an input speech event). Optionally, at 915 it is determined whether the mobile device 100 is currently at rest, within acceptable tolerances. This may be determined using the kinetic UI 320 or tracking UI 330 (in the case of the tracking UI 330, this may be determined by comparison of multiple images captured by one of the cameras 126*a*, 126*b* within a short period of time (on the order of milliseconds), and carrying out matching algorithms on objects detected in the images to determine whether any shifts in the objects are within a specified tolerance). If the device 100 is currently not at rest, then the device 100 moves to a wait state in which it is determined at 920 whether a timeout has occurred. If so, the method ends. If not, then calibration may be re-initiated at 910.

Figure 4B:
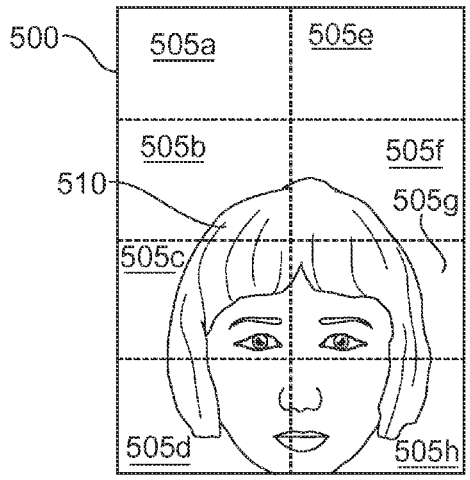
Figure 5B:
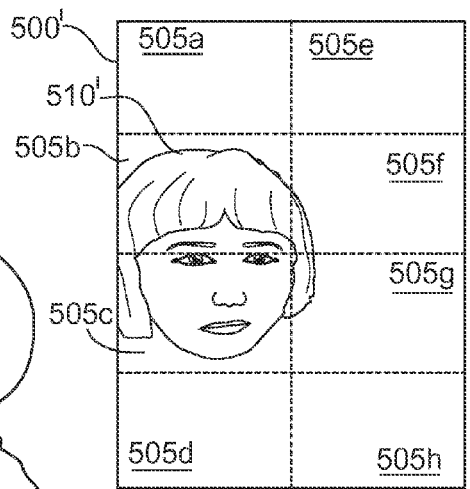

Next, at 925 tracking UI data is collected; the front-facing camera 126*a* is used to capture an image of the user, as in the example of FIG. 4B. This image or data derived from it is stored by the tracking UI 330 or the workspace manager 300. The data derived from the captured image may be an object definition; for example, face or object recognition is executed on the captured image, and only that data defining the position of the user's face within the image is stored, rather than the entire image. This image or derived data is stored and designated as the home position reference in the data store 305 at 930. As noted above, the origin point O of the physical region 600 can be determined with reference to the home position, and the image or derived data can be stored in association with the origin point. It will be appreciated by those skilled in the art that since full image data need not be stored, lower quality image data may be captured instead of the multiple-megapixel, high color bit depth images typically captured by current mobile device cameras 126*a*, 126*b*, and indeed lower quality image sensors with a smaller response range may be used.

FIG. 9B briefly illustrates a method for associating a defined region in the physical region 600 with one or more data item characteristics. At 940, a location of the physical region 600 is defined and/or selected. This may be carried out as described above with reference to FIG. 8; however, it may be defined and selected a number of other ways. For example, once the home location has been defined, the user may move the mobile device 100 (while still holding it) to a particular subregion in the physical region 600, and its new position could be determined using the tracking UI 330, in a manner similar to that described above. Optionally, particularly if the subregion to be defined is irregular in shape, the user could then move the mobile device 100 around the desired subregion while the tracking UI 330 continues to collect image data representing the mobile device 100's position in the physical region 600. Once the user has indicated that movement of the mobile device 100 is complete, the workspace manager 300 can compute the approximate physical bounds of the designated subregion based on a comparison of the captured image data to the data obtained for the home location. The physical bounds may be stored as coordinates (in any appropriate coordinate system and using any suitable scale or unit of measure) in the workspace manager data stored 305. If facial or object recognition is carried out on the captured images, the physical bounds may instead be stored as a range of acceptable values defining the position and shape of the detected face or object in the image (it is presumed in these examples that an image of the user, likely including the user's face or head, is captured by the front-facing camera 126*a*). The position and shape determined from the captured images would be included within this range of acceptable values. If only a pinpoint (i.e., a single) location has been defined by the user, then only a single set of coordinates may be stored, or a single set of values defining the position and shape of the detected face or object in the image is stored. It will be appreciated by those skilled in the art that the use of the mobile device 100 in this manner may result in attitude changes (and specifically, orientation changes) as the mobile device 100 is moved above by the user; in some cases, it may be expedient to automatically disable any function on the mobile device 100 that automatically changes the orientation of the display contents in response to detected orientation changes.

Once the location has been defined in the physical region 600 and selected at 945 it is associated with one or more data item characteristics. At 950, this one or more data item characteristics is stored in the data store 305 in association with the location definition. The data store 305 may be structured as a database including location definitions and associated data item characteristics, as well as optional data item identifiers, as will be seen below.

Association of a particular data item with a location in the physical region 600 either expressly or through assignment of a particular data item characteristic (itself associated with a particular location) to the data item can be carried out by the mobile device 100, for example at the time of an event relating to the data item occurring at the mobile device 100. The event may be creation of the data item if it is created at the mobile device 100, receipt of the data item, when the data item is accessed, or when the data item is stored. Any of these events may be considered an example of "obtaining" the data item at the mobile device 100. The event can be specific handling at the mobile device 100 in response to user instruction. In a simple example, the data item can be associated with the desired physical location within the physical region 600 without physically placing the mobile device 100 at the desired physical location; a location may be expressly assigned to the data item using, for example, a graphical user interface similar to that shown in FIG. 8, permitting selection of a particular portion of the physical region 600 from a graphical representation thereof, and/or selection of a particular data item characteristic such as a tag or category. However, rather than requiring the user to visualize a three-dimensional region using a two-dimensional projection, the association of the data item with the desired physical location can be accomplished through actual physical displacement of the device 100 with respect to the user. FIGS. 10A to 10H illustrate examples of this physical means of association.

FIG. 10A shows a first view 1000*a* of an application displaying a data item, such as a messaging application displaying a received email. In this example, the email has already been received by the mobile device 100, and it has now been accessed at the mobile device 100. In addition to typical features of an email display (e.g., header information, body content, UI elements for initiating actions such as reply, forward and the like), one or more further optional UI elements may be displayed to signal the device's readiness to receive input associating the data item with a location in the physical region. In the example of FIG. 10A, the view 1000*a* includes a status bar element 1010 including current computed coordinates 1012*a* of the device 100 within the physical space 600, as might be determined using the methodologies and components described above, and data item characteristic information 1014*a* associated with the current computed coordinates. If the device 100 is configured to track the location of the device 100 within the physical region 600 in real time as the device 100 is moved, then the content of the status bar element 1010 may be similarly updated in real time. Alternatively, this status bar may be absent from the view 1000*a* unless expressly invoked by user command.

While the data item is displayed, the user can move the mobile device 100 to the desired location in the physical region 600. An instruction is then invoked to indicate to the workspace manager 300 that the device 100 is in the physical location to be associated with the data item, and to instruct the workspace manager 300 to associate the data item with that location. The instruction may be invoked through one of a number of UI mechanisms; for example, an input speech command may be detected, or the user may click or tap a physical or virtual convenience key or button provided on the device 100, or execute a predetermined gesture input on a touchscreen. In response to this input command, the device 100 determines the current physical position of the device with reference to the home location and/or origin of the physical region 600, for example using the tracking UI 330 as generally described above (in which case the front-facing camera 126a is best oriented generally towards the user, such as in the example of FIG. 5A). The workspace manager 300 receives the physical position data and may then store this in association with the data item. The physical position data need not be stored with the data item itself, i.e. in the email data store on the device 100; instead, the physical position and an identifier for the data item (e.g., a unique or quasi-unique message identifier and optionally an identifier of the associated messaging application or email data store) can be stored in the workspace manager data store 305.

FIG. 10B illustrates a possible subsequent view 1000b of the same messaging application displaying the same email message after the current physical position data is recorded for the message. In this example, the status bar element 1010 is still displayed, but the current coordinates 1012b of the device within the physical region 600 have been updated according to the physical placement of the device in the region, and updated associated data item characteristic information for those coordinates (or their surrounding region within the physical region 600) 1014b is displayed as well. In response to an input command to associate the physical location of the device 100 with the data item, confirmation of the recordal of this association can be displayed in a further UI element 1016. This confirmation may be transitory; for example, the UI element 1016 may be displayed only briefly before being automatically dismissed and reviewed from the view 1000b, without requiring further user interaction.

Figure 10D:
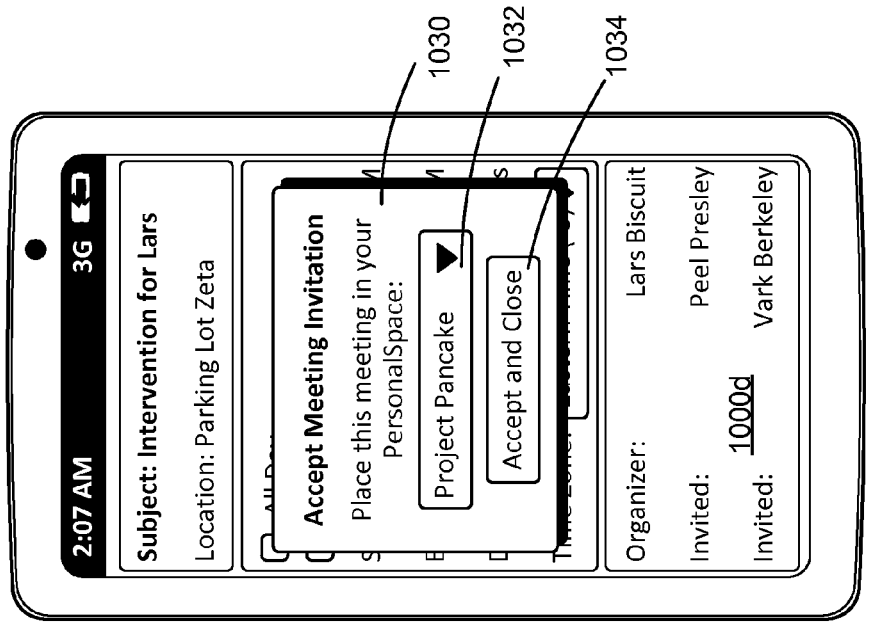
Figure 10C:
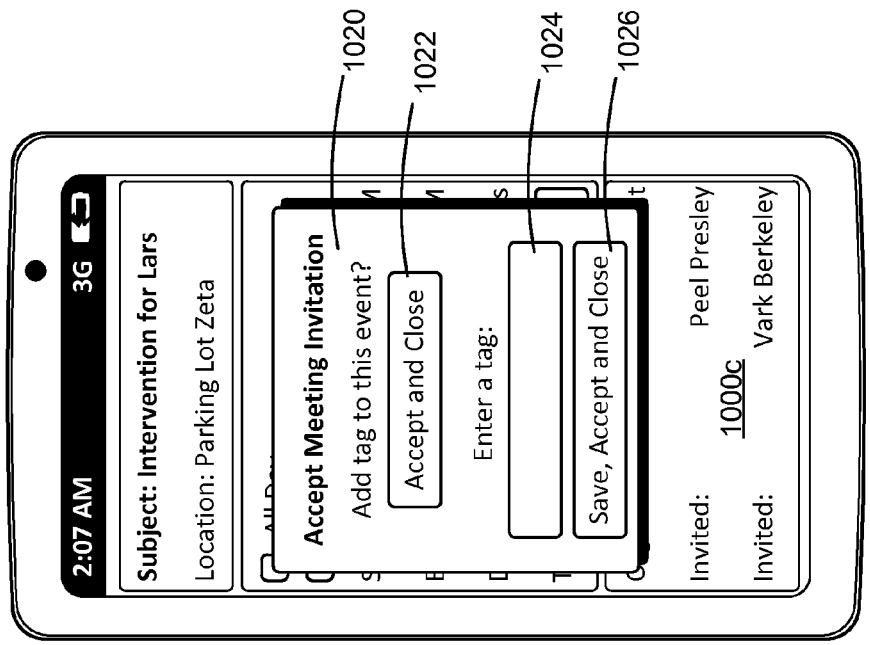

FIGS. 10A and 10B thus illustrate an example where the data item was accessed at the mobile device 1000. FIGS. 10C and 10D illustrate a further example in which a data item is received and displayed. FIG. 10C shows a first view 100 of a calendar application as one example. In this example, the mobile device 100 has received a meeting invitation sent by a meeting organizer, and the user is in the process of accepting the meeting invitation. In this implementation, a dialog box 1020 is displayed, soliciting input regarding the addition of a tag value as a data item characteristic. Options in this example are provided to simply accept the meeting invitation with a first UI element 1022 (a virtual button), without adding any tag values; and to add a tag value in a text entry input field 1024, and to select an option to save the tag value and accept the meeting invitation with a further UI element 1026. In this example, the user may thus define new tag values, rather than being required to select a previously existing tag value (for example as might be defined with reference to FIG. 8). However, if the user inputs a value that matches a previously-defined value, then the meeting invitation is associated with that previously-defined value. In a variation shown in the second view 1000d of FIG. 10D, a dialog box 1030 is provided with an option to select a previously-defined tag value using the drop-down list UI element 1032. Whether a tag value is selected or not, the only option provided in this example is to accept the meeting invitation; if a tag value is selected it is saved in association with the data item. Thus, in the examples of FIGS. 10C and 10D, the dialog box 1020, 1030 is displayed in response to the user's instruction to accept the meeting invitation.

The dialog box 1020, 1030 may be a UI element displayed by the calendar application in response to the instruction to accept the invitation, and this may be the case in particular where the workspace manager 300 is integrated with the calendar application, since the workspace manager data store 305 stores the various tags in association with physical region 600 locations. When the workspace manager 300 is a separate module from the application, the dialog box UI element may be called by the workspace manager 300 itself. For example, when the meeting invitation is first displayed at the mobile device 100 by the calendar application, the calendar application presents accept and decline options to the user (e.g., through a menu option or through display of UI elements on the screen 110). If the invitation is accepted, a calendar event is stored in the calendar data store at the mobile device 100. The calendar application may then notify the workspace manager 300 of the new calendar event, providing an identifier for the calendar event to the workspace manager 300. Alternatively, the workspace manager 300 may detect changes (in particular, additions) to the calendar data store. Either way, when the workspace manager 300 is notified or detects a new calendar event at the mobile device 100, it displays the dialog box 1020 or 1030, or invokes some other UI event to solicit user input of a tag value or other data item characteristic for the calendar event.

The workspace manager 300 may intervene in a similar manner for other types of data items, such as messages. For example, when a new message is read by the user using a messaging application executing at the device 100, the message is marked "read" or "opened" (these terms, as those skilled in the art are aware, denote that a message is no longer new and that it has been handled by the user, although the user may not have literally read the message). The workspace manager 300 is then notified of the change in status of the message and the message identifier, and invokes a UI event such as a dialog box requesting input of a data item characteristic for that message. The workspace manager 300 then receives the input data. In the case of messages, intervening at the point when the message is marked "read" is more appropriate than soliciting input attribute values for the message at the time it is received by the mobile device 100, since the user may not read the message right at the time it is received and may be using the mobile device 100 for some other activity. However the input data item characteristic is obtained, though, it is then stored in association with the data item. As discussed above, storing in association with the data item may comprise storing the identifier for the data item in the workspace manager data store 305 in association with the data item characteristic. In some examples, storing in association with the data item may involve modifying the data item itself to include further metadata comprising the input data item characteristic. If a physical location in the physical region 600 is already associated with the data item characteristic, then the data item is now associated with this location as well by virtue of its data item characteristics.

Figure 10F:
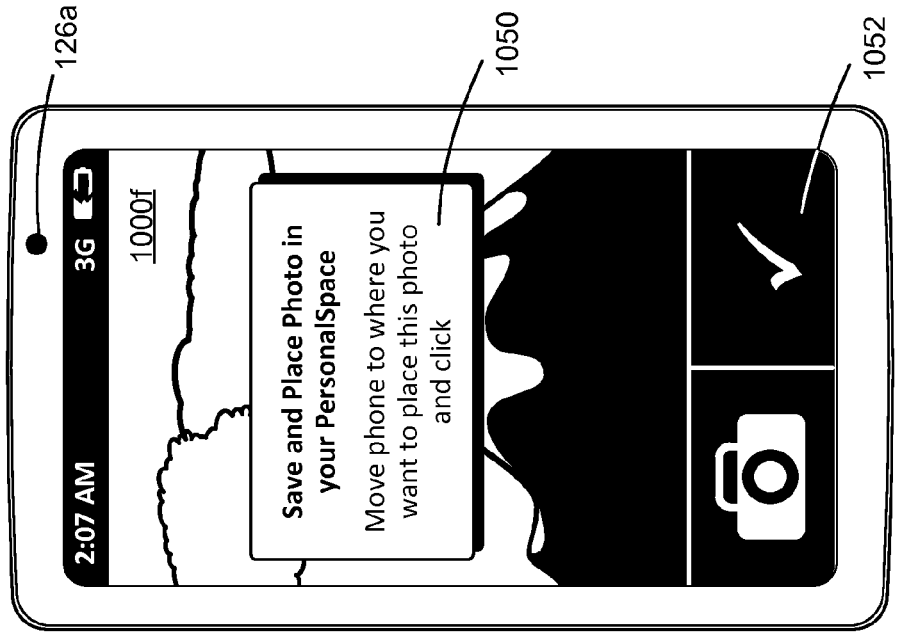
Figure 10E:
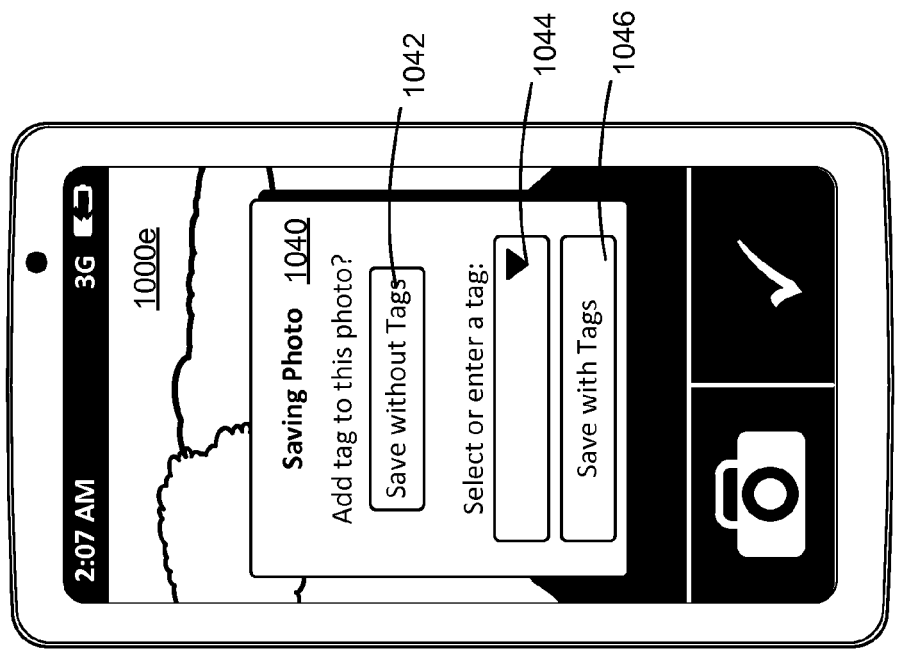

FIG. 10E illustrates a similar example to FIG. 10C, this time for a photograph taken by a camera application. In response to a "save" command, either the camera application or the workspace manager 300 intervenes with a UI event to obtain user-input data item characteristics. In FIG. 10E, the view 1000e again provides a dialog box 1040, with options to simply save the photo 1042, or to select or enter a tag 1044, and to save the photo with the selected or entered tag 1046. The photo is then saved with the selected or input tag, or else a photo identifier (e.g., the file name, or a unique value associated with the photo on the device 100) is saved in the data store 305 in association with the relevant data item characteristics.

In these examples, a data item characteristic is solicited from the user. However, default data item characteristics may be associated with any specified data item automatically when the data item is obtained. This is logically the case where the data item characteristic is inherent in the data item (such as a timestamp of a message or start date of a calendar event, or the importance value of a received email message), since the data item is in possession of this characteristic at the time the data item is obtained, or when the data item characteristic comprises the data item type. Default data item characteristics may also be associated with a data item according to a predefined rule. For example, the permissions or sharing attribute of any photos using the mobile device 100 taken are automatically assigned a "public" value.

FIGS. 10C to 10E thus illustrate examples where a graphical user interface mechanism—as illustrated in these figures, a touchscreen interface—is used to define a data item characteristic for the data item. In other cases, though, such as in FIGS. 10A and 10B, this can be achieved through the kinetic UI 320 or tracking UI 330. When the data item is saved (accessed, read, etc. or otherwise "obtained"), the mobile device 100 is positioned in the location to be associated with the data item, and the data item is then saved in association with that location. FIG. 10F shows a further view 1000f of the camera application as an example, again at the point when the photo is to be saved. At this point, in response to the save command received from the user, a UI event is triggered by the application or by the workspace manager 300 to receive input from the user confirming that the mobile device 100 has been placed in the location in the physical region 600 with which the data item is to be associated. For example, as directed in the example dialog box 1050 shown in FIG. 10D, the user would move the mobile device 100 to the desired location in the physical region 600 around the user, then "click" or tap the screen (or press a button, or input some other command as appropriate) to indicate that the mobile device 100 is in the proper location. In response to this input command, the current physical position of the mobile device 100 with respect to the user is determined, for example using the tracking UI 330 as generally described above to detect the device's current physical position (in which case the front-facing camera 126a is best oriented generally towards the user, such as in the example of FIG. 5A), and then the photo is saved in association with the location within the physical region 600 either in the camera application data store or in the workspace manager data store 305 as described above. In this manner, then, a non-textual, non-visual UI mechanism is used to associate a (likely text-based) data item characteristic with the data item, because the data item was associated with a location in the user's physical region 600 that is in turn associated with the data item characteristic. The dialog box 1050 need not be used. Instead, a more discrete indicator may be provided to the user to indicate that the data item may be associated with a location in the physical region 600. An example is shown in FIGS. 10A and 10B, with a smaller status bar element 1010 that did not substantially obscure the displayed data item. Another example, not shown, would be the inclusion of a further UI button or similar element in addition to those typically displayed in conjunction with the data item. In still another example, the UI event associated with saving the data item can also serve as the event used to trigger the recordal of the current location of the device 100 in the physical region 600 in association with the data item, thus eliminating the need for a separate user input. In the example of FIG. 10F, when a "save" function is invoked by actuation of the save UI element 1052, the workspace manager 300 automatically stores the currently detected physical location of the mobile device 100 in the physical region 600 in association with the data item.

Association of the data item with a particular location in the physical region 600 may also take place at the point of item creation. In the case of a photograph, since position of the mobile device 100 (and in particular its camera 126a or 126b) is important to the composition of a picture, it is usually more appropriate to use the tracking UI 330 or kinetic UI 320 to specify an associated location for the data item within the physical region 600 after the photograph has been taken, and is about to be saved (or has been saved). In the case of other data items where the precise positioning of the mobile device 100 is not as important, this association can take place earlier. FIG. 10G shows a further view 1000g, this time of a memo or voice dictation application with subject/tag input field 1062 and content input field 1064. The position of the mobile device 100 with respect to the user is not as important, provided the microphone 120 (not shown in FIG. 10G) is still capable of picking up the user's speaking voice. When the user initiates recording of a new voice memo, he holds the mobile device 100 in the location in the physical region 600 with which the voice memo is to be associated, and initiates recording (in the example of FIG. 10G, a dialog box 1060 is displayed, directing the user to hold the mobile device 100 in the desired location; however, this additional UI element is not necessarily displayed). At the time the recording is initiated, the tracking UI is used to detect the current physical position of the mobile device 100 within the physical region 600, and this current physical position is stored. The user can then dictate the voice memo, and then input a command (a tap on a touchscreen in this case) to end recording and save the voice memo file.

Figure 10H:
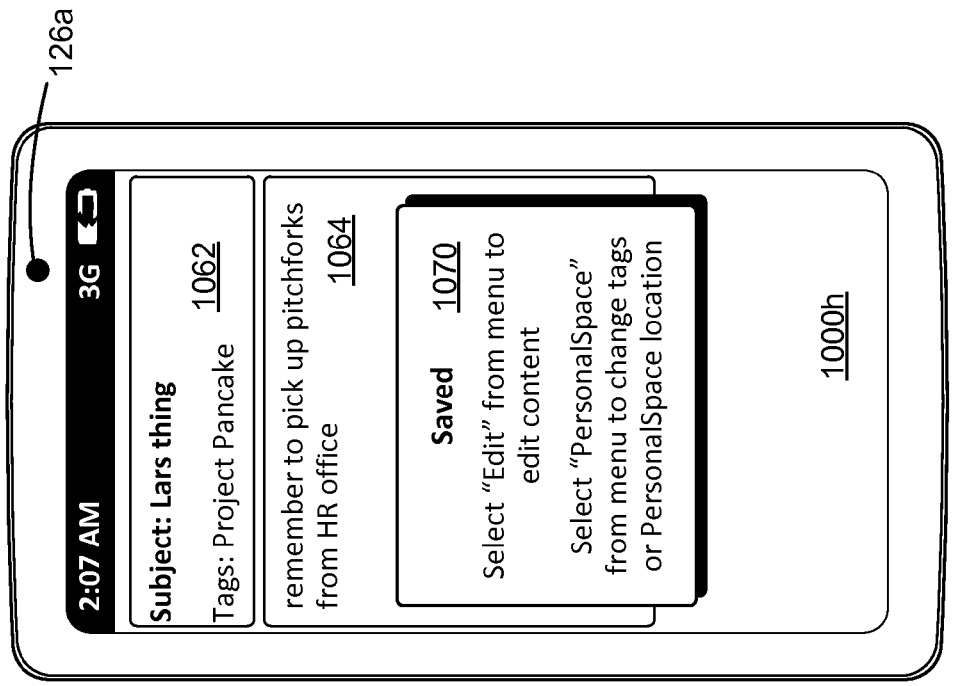
Figure 10G:
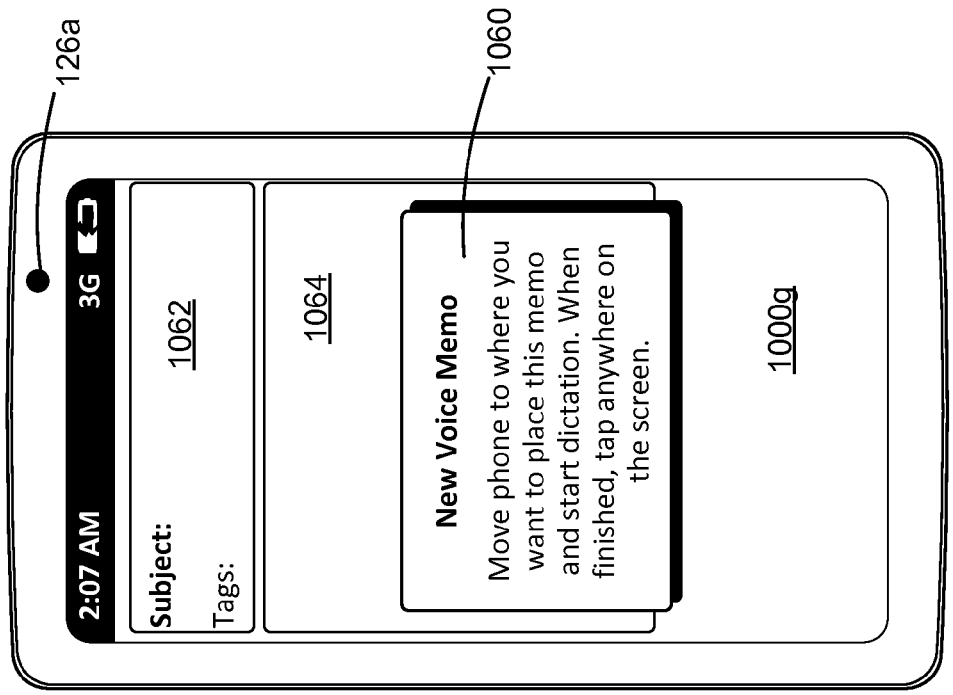

An example of a resultant view 1000h on the mobile device 100 once the voice memo file has been stored in association with the detected physical position of mobile device 100 during dictation is shown in FIG. 10H. In this example, optional speech-to-text conversion has been carried out on the recorded speech, so the view includes the converted text in the content input field 1064, which the user may subsequently edit as desired. The subject/tag input field 1062 has also been populated with content; the subject line may have been obtained from the speech-to-text conversion, while the tag associated with the voice (and text) memo was determined from the detected physical position of the mobile device 100 at the time the recording was made, since that physical location was associated with that data item characteristic. View 1000h also includes a further dialog box 1070 informing the user of options to edit the content or tags of the voice memo. In this example, then, the tag value (or other data item characteristic) was associated with the data item because the data item was created in the physical location associated with that characteristic.

Figure 11B:
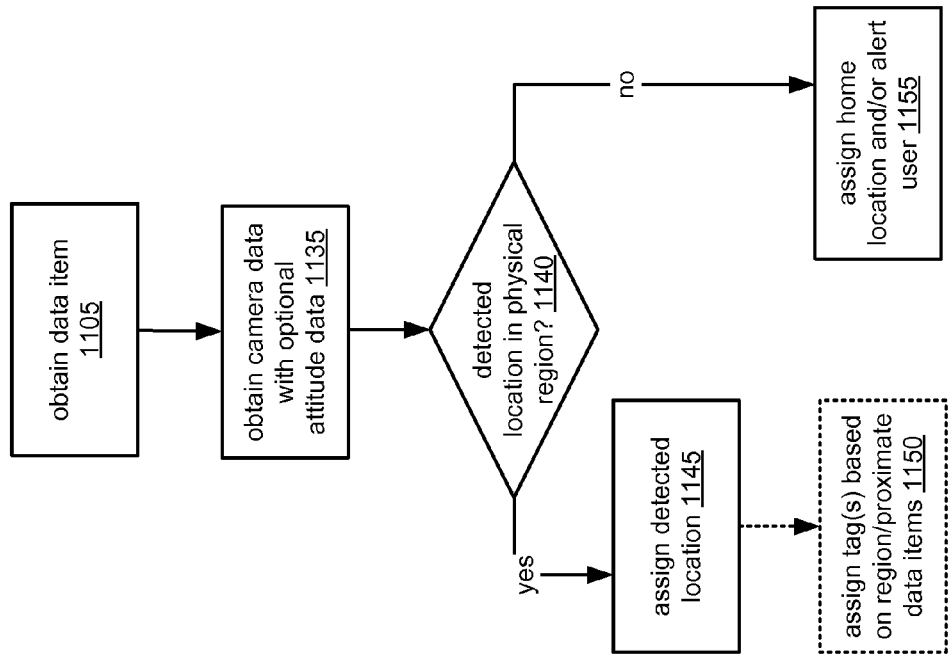
FIGS. 11A to 11C are flowcharts illustrating methods for associating locations in the physical region with a data item.
Figure 11A:
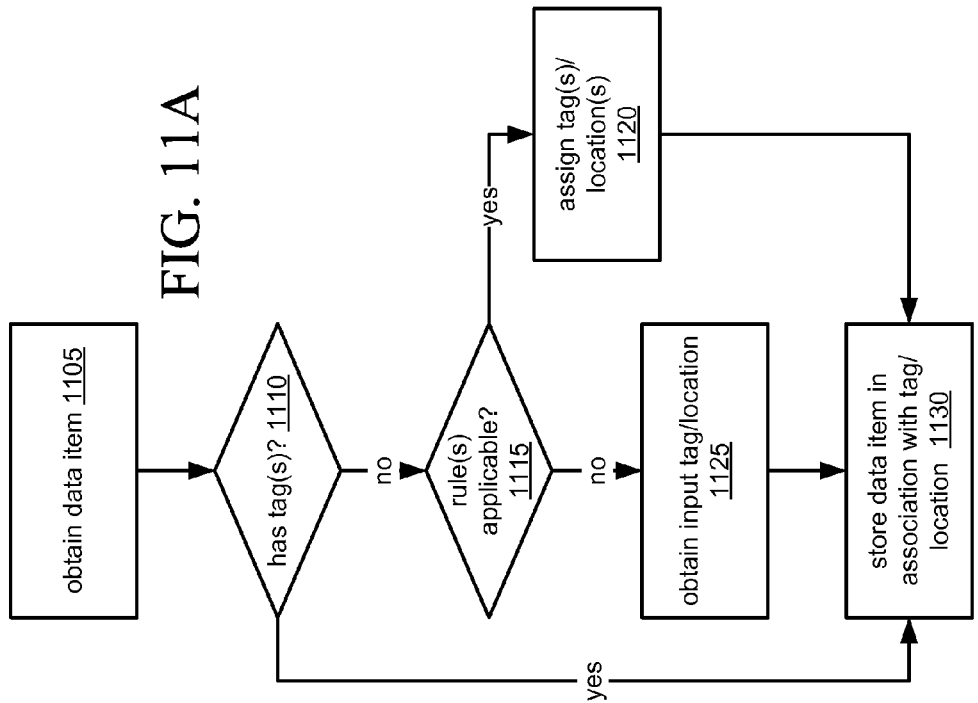

FIGS. 11A and 11B illustrate methods for assigning tags and/or locations within the physical region 600 to a data item. Turning first to FIG. 11A, a process for automatic assignment of default tags or other data item characteristics to a data item is shown. At 1105 a data item is obtained (which may be the creation of the data item, accessing the item, saving it, etc.). At 1110, it is determined whether the data item is already associated with one or more data item characteristics (FIG. 11A refers to "tag(s)" as an example of a data item characteristic). As discussed above, the data item is already associated with characteristics when these characteristics are inherent in the data item; however, there may be other characteristics, such as topical tags, that are expressly assigned to the data item. This could be the case if the data item is obtained at the mobile device 100 by being received from another party (e.g., a meeting invitation, downloaded file, message, etc.).

If the data item already is associated with one or more tag values or other topical attribute values, then the method moves to 1130, where the data item is stored in association with that value. As before, this storage may comprise storage of a data item identifier (e.g., message ID, filename, etc.) in the workspace manager data store 305 in association with the specified characteristic(s). If the data item is not already associated with tags, then at 1115 it is determined whether any defined rules are applicable to the data item. If this is the case, those rules are applied at 1120. The rules may operate to assign a particular tag or tags to the data item or to associate the data item with a particular location in the physical region 600. If there are no rules, however, then at least one input data item characteristic or an input location is obtained for the data item at 1125. The input of a data item characteristic or input of a location may be carried out as described above with respect to FIGS. 10A to 10H; the data item characteristic may be obtained via a graphical user interface, or else a location may be determined by the kinetic UI 320 or tracking UI 330 as described above. Once this input data is obtained, it is stored in association with the data item 1130 as generally described above.

FIG. 11B depicts a further method in which a location is associated with a given data item based on a single location reading, without the mandatory operation of any rules as in FIG. 11A. Again, the data item is obtained at 1105. At 1135, tracking UI data (and optionally kinetic UI data) is obtained to determine the position of the mobile device 100 in the manner described above. Thus, in this example method, it is presumed that at the time the data item is obtained, the mobile device 100 is already in its desired target position, as in the examples of FIGS. 10D and 10E. At 1140, it is determined whether a location in the physical region 600 was successfully detected. If not location was successfully detected at 1140, then at 1155 either the home location is associated with the data item as a default value, or else the user is alerted to an error in detecting the physical location of the mobile device 100.

If so, at 1145 the detected current physical location of the mobile device 100 is assigned to the data item. This association can then be stored in the data store 305 or in another suitable data store. Further, at 1150 any tags or other data item characteristics associated with the assigned location (within defined tolerances) may be determined, and those characteristics expressly associated with the data item. This further step may be considered optional; for the purpose of later retrieval, as will be seen, it is sufficient if the location is associated with the data item. However, it can be seen from this example that when the data item is "placed", so to speak, in a particular location of the physical region 600, the data item acquires the tag values or other characteristics that are associated with that location.

In some cases, no data item characteristics may have been expressly associated with that physical location. However, if other data items had previously been associated with that location, any expressly assigned characteristics of those older data items are then associated with this recently "placed" data item at 1150; in other words, this particular data item takes on the same characteristics (e.g., the same tag values) by virtue of its proximity to other data items. There thus is no requirement on the part of the user to expressly define a tag or other characteristic in association with a location of the physical region 600; rather, the user can simply start "placing" data items in a particular location of the physical region 600. If any of the data items have a previously defined tag value, this tag value may then be assigned to the remaining data items in its proximity. A data item is proximate to another if it is within the same defined subregion of the physical region 600, or if it is within a defined threshold distance from the other data item. This threshold may be defined on the order of centimeters or inches, depending on the sensitivity of the tracking UI (or kinetic UI) to changes in position.

In another example, the location of the mobile device 100 is determined using a set of measurements obtained by the kinetic UI 320 and tracking UI 330, rather than only using a single reading. In this case, once the data item is obtained at 1105, the current position of the mobile device 100 is detected at 1160 as described above. This current position may be presumed to be the home location, or may be another location. Again, the mobile device 100 may default to the home location if the current position cannot be successfully obtained at 1160. At 1165, data collection by the orientation/INS module 124 starts (if the tracking UI 330 is used to detect the final position of the mobile device 100, data collection by the module 124 may not be necessary. The start of data collection may be triggered by an input instruction at the mobile device 100. Data is collected until the mobile device 100 is signalled to stop at 1170, which may occur based on a further user input, or else by detection by the tracker or kinetic UI that the mobile device 100 has ceased movement. (During this period, the user is presumably moving the device from its original position at 1160 to its final position.) At 1175, the final position of the mobile device 100 is computed from the known original location and the kinetic data obtained from the orientation/INS module 124. If the tracking UI is used, then the final position of the mobile device 100 may be computed using image data captured at the final position. At 1180, the new detected current location is assigned to the data item, and stored in association with the data item. Finally, as in the method of FIG. 11B, tags or other data characteristics may be assigned to the data item based on the location with which the data item was associated, or based on the characteristics of other data items in its proximity.

In a further example, the physical position to be assigned to a data item may not be limited to the actual physical position of the mobile device 100 in the physical region 600. If the tracking UI 330 and/or kinetic UI 320 is configured to detect the velocity and acceleration of the mobile device 100, the user may effectively "throw" a data item, and a final location within the physical region 600 (which therefore extends beyond the user's physical reach) can be computed for the data item based on simulated physical characteristics of the data item and the detected motion of the mobile device 1000. For example, rather than merely holding the mobile device 100 at the desired location and inputting a command indicating that the current location is to be stored in association with the data item, the tracking UI 330 and/or kinetic UI 320 continues to monitor the current position or acceleration of the device 100 with respect to time until the mobile device 100 detects (e.g., using the orientation/INS module 124) that the device 100 has stopped moving. The motion data thus obtained by the tracking UI 330 and/or kinetic UI 320 is then used to compute the ultimate location of the data item, given the last known position of the data item in the physical region 600 as determined by the tracking UI 330 and/or kinetic UI 320 and the velocity and acceleration of the data item at that point as determined from the motion data, based on predefined values for the mass of the data item (which may be assumed to be a point mass or idealized small object with an arbitrary mass) and external factors such as drag. The data item may thus be thrown or "pushed" away from the user within the physical region 600.

Figures 11C, 11D:
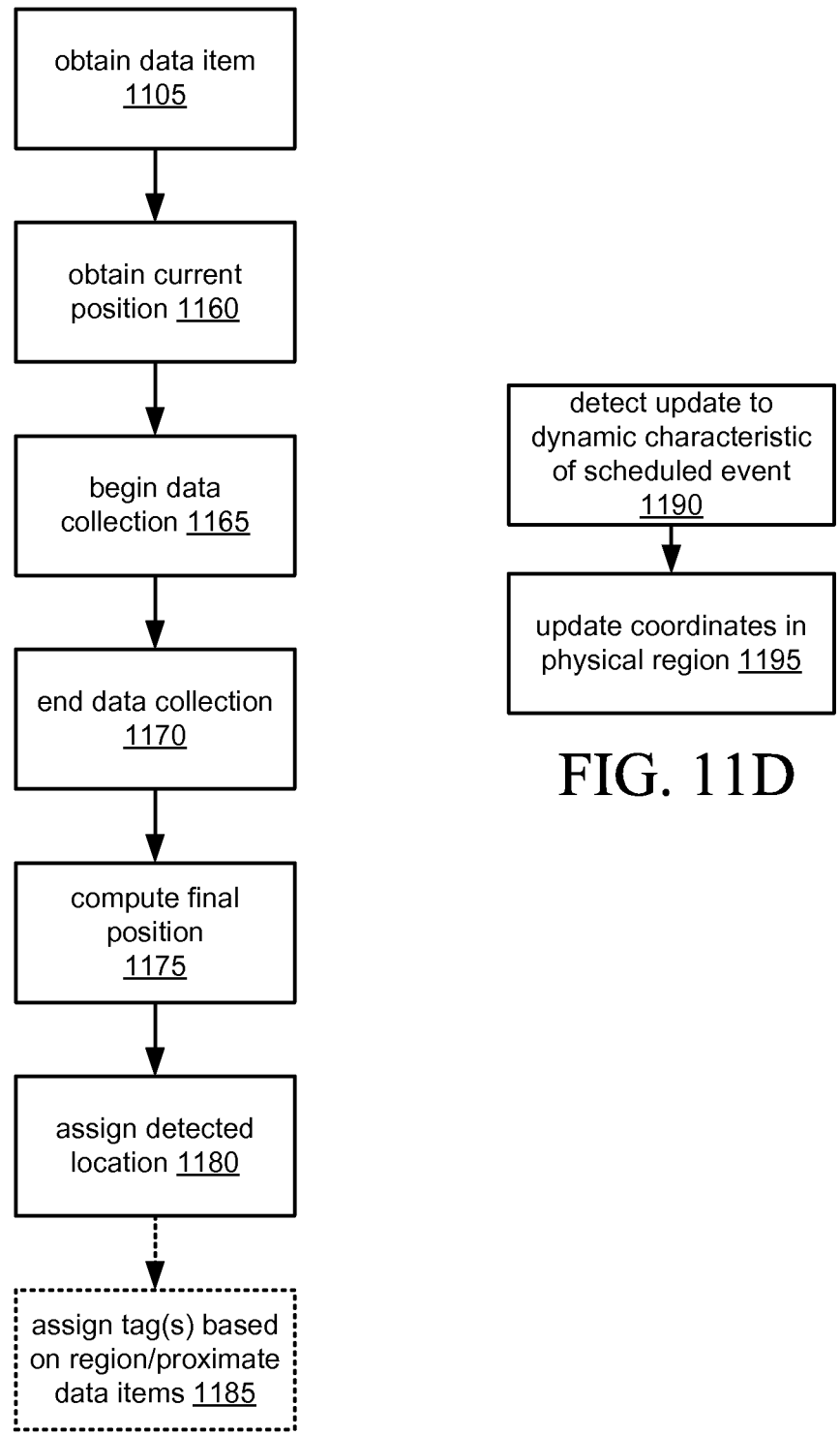
FIG. 11D is a flowchart illustrating a method of updating a location associated with a data item in response to detection of a timed event.

The example of FIG. 11C is an example using the kinetic UI 320 to gather spatial data for a data item. This example may also be applied to those circumstances where a data item is retrieved at the current position at 1160 (as discussed below), and "moved" to a new location at 1180.

The effect of the foregoing "placement" of data items in accordance with the methods of FIGS. 11A to 11C is illustrated in FIG. 12A. FIG. 12A illustrates the first subregion 710 of the physical region 600, to which a number of data items 1205*a, b, c, d*, e and f have been assigned. Their placement in the subregion 710 may be the result of assignment of a particular data item characteristic to the subregion 710 (e.g., tag value="work"), and the assignment of this characteristic to data items. As a result of the data items being assigned this characteristic, the data items are associated with this subregion 710. (In some examples a random location within the associated subregion 710 may be assigned to the data item so that the data items appear "scattered", as shown in FIG. 12A. In other examples, the data items are all assigned the same physical pinpoint location.) Alternatively, their placement in the subregion 710 may be the result of a direct allocation of the data item to this subregion, for example in the manner described with reference to FIG. 10A, 10B, 10F or 10G or using the "push" or "throw" technique described above.

Once assigned to a specific position in the physical region 600, the data items need not be static. As noted above, some data item characteristics are dynamic, such as the time to elapse before a specified start time. If a particular location of the physical region 600 is associated with a dynamic attribute such as time, the position of the data item within the location may be adjusted to reflect the changing attribute value. This process is reflected succinctly in FIG. 11D for a given scheduled event or event with a due date, such as a calendar event or task, which includes a dynamic attribute of "time to elapse before start time/due date". The value of this attribute decreases with advancing time. At 1190, an update to the dynamic characteristic is detected; for example, periodically the time to elapse is recomputed for all scheduled events or due date events stored at the mobile device 100. At 1195, upon detecting a change to this characteristic for a given data item, the location coordinates for the data item are updated to reflect the change.

An example is provided in FIGS. 12B and 12C. The subregion 720, previously illustrated in FIG. 7B, is in this case associated with the "time to elapse" attribute, and optionally with calendar and task events, specifically. Those portions of subregion 720 further way from the origin point O of the physical region 600 are associated with a greater "time to elapse" attribute value, such that the smaller the value (i.e., the more imminent the data item is), the closer it is to the origin point. In FIG. 12B, for example, there are six events present in the subregion 720, 1215*a, b, c, d*, e, and f. Events 1215*a* and 1215*b* are located in the space between the mobile device 100 (this may be the home position) and the origin O, in that their distance from the origin O is smaller than the distance of the mobile device 100 from the origin O. In this example, since the physical region 600 is defined as a sphere (although as noted above this is not a mandatory configuration of the physical region 600), the distance may be computed as a radial distance from O in three dimensions, or may be computed as a radial distance from O in the x-z plane (or in another plane).

The positions of the various events 1215*a* to *f* can be updated on a periodic or ad hoc basis according to a predefined correlation of distance and time. For example, a first range of distances closest to the origin point O (e.g., between up to 20 cm away from the user, if the origin point O is located in an axis with the user's body such that the mobile device 100 cannot occupy the space at O) may be associated with currently occurring events or overdue events, or in other words events with a time to elapse attribute that is zero or a negative value; a second range (e.g., greater than 20 but less than 40 cm) can be associated with events scheduled to occur that day, or in other words events with a positive time to elapse attribute and a start time before midnight; a third range (e.g., greater than 40 cm but less than 60 cm) can be associated with events scheduled to start during the current work week; and distances outside this third range may be associated with events scheduled to start after the current work week. The distances outside the third range may include distances that are not physically within the user's reach as mentioned above, but are still considered to be within the physical region 600. The events assigned to a location outside the user's reach will still be available for review and editing at the mobile device 100 using conventional user interfaces (e.g., using the calendar or task application executing on the device 100), and ultimately will come "into reach" for the user as their position is updated and their associated time to elapse decreases, and their start time approaches. The positions may be recomputed every 15 or 30 minutes, or optionally each time an update trigger is detected at the mobile device 100, such as a manually-invoked instruction to update positions of the data items, or creation of a new data item with an associated physical region location.

An example of the physical position of the various data items after some time has elapsed is shown in FIG. 12C. In this example, the distance between the location of events 1215*a*, 1215*b*, 1215*d*, 1215*e* and 1215*f* and the origin point O has decreased by some amount (not necessarily by the same amount, since the distance may be dependent on other data item characteristics such as an assigned importance, category, etc.). Event 1215*c* no longer appears in the subregion 720 as a result of dismissal (e.g., disassociation of a physical region location with the event, such as by assigning a null value to its associated location) or deletion of the event at the mobile device 100. In this case, events 1215*a* and 1215*b* may now be current or overdue. In the meantime, a new scheduled event 1215*g* has appeared at the periphery of the subregion 720, indicating a (temporally) distant event.

Figure 12D:
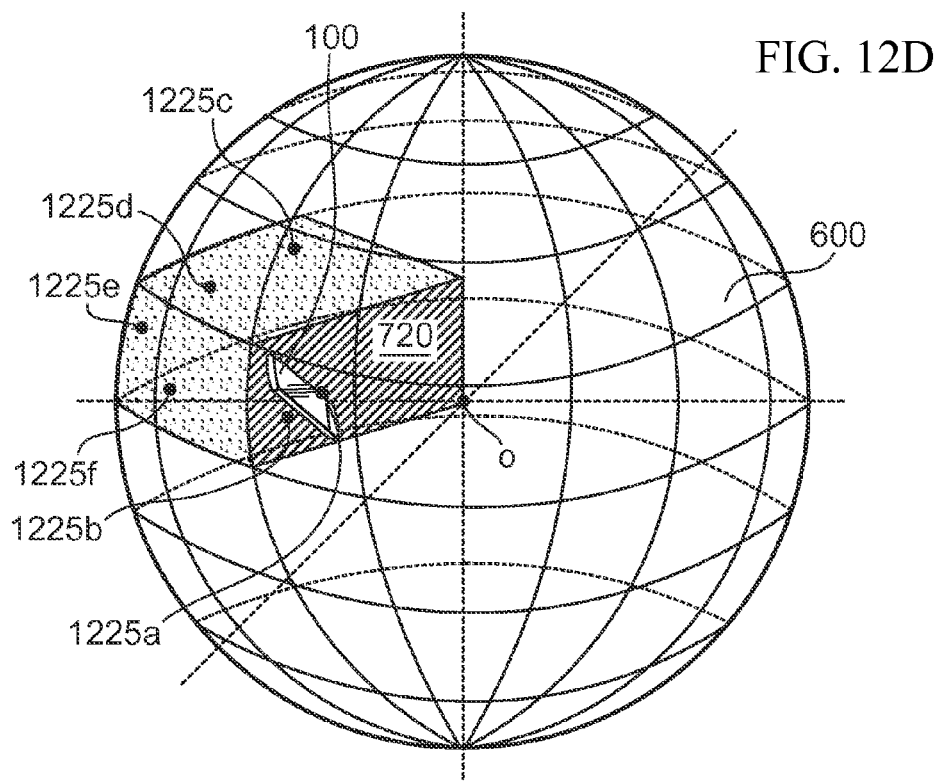

FIGS. 12B and 12C illustrate an association of distance and time using the origin point O (or as close as the mobile device 100 can get to the origin point O) as the zero point, i.e., the position assigned to overdue or current data items. In other examples, the zero point is at the home position of the mobile device 100 defined above, such that imminent and current events are at the mobile device 100. In FIG. 12D, six events are again depicted in the subregion 720, 1225*a, b, c, d*, e, and f. Events 1225*a* and 1225*b* are at the home location of the mobile device 100, or close to it (i.e., within a specified distance). Those events are imminent, for example with a due date or start time between o and 15 minutes from the current time, or else are currently ongoing. The third event, 1225*c*, is next closest to the home location, indicating that it is somewhat closer in time than the remaining three events 1225*d, e, f.*

Figure 12E:
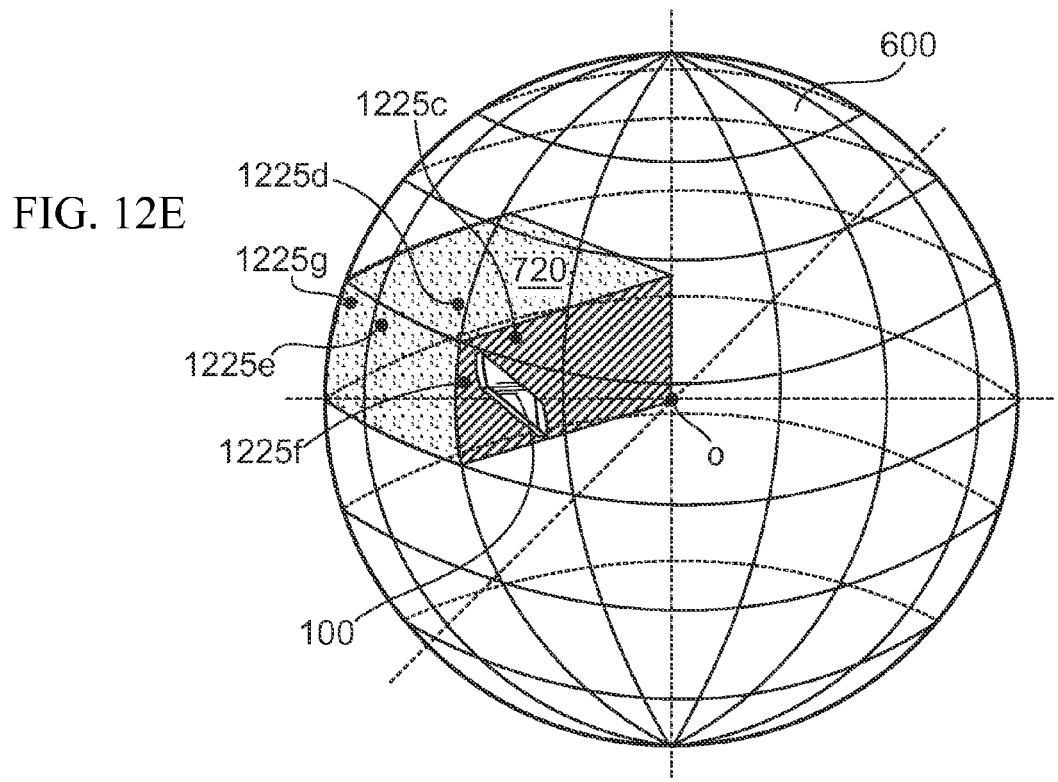

Once an event has passed, however (e.g., its end date is in the past, or it is overdue, or has been dismissed by the user), it may be removed from the physical region 600 altogether, or at least, when the user retrieves or reviews data items associated with the physical region 600, it is not included in the retrieval or review. Thus, in FIG. 12E illustrating the same subregion 720 at a later time, events 1225*a* and 1225*b* are no longer present (for example, they have been deleted from their respective data stores, and/or any record of them has been deleted from the workspace manager data store 305, or their location has been reassigned to a null value). Events 1225c, 1225d and 1225f, however, have had their location coordinates updated to reflect a location that is closer to the home location, since their "time to elapse" attribute value will have decreased. Again, in the meantime, a new scheduled event 1225g has appeared at the periphery of the subregion 720, with a greater time to elapse value than the other remaining events. Thus, as can be seen from FIGS. 12D and 12E, the relative locations of the data items is indicative of the relative value of a particular data item characteristic, and the location of the data item with respect to the user, and specifically the home location, is indicative of the imminence or urgency of the data item. In other examples, the locations of overdue items in the physical region 600 continue to be updated to have a position in the range between the home position of the mobile device 100 and the origin point O.

Conventionally, if the user wished to retrieve all data items having a particular tag value or other data item characteristic, he would have to search the data stores of the mobile device 100 using a textual or visual UI mechanism. However, since the various data items discussed above have been assigned a location within the physical region 600, and the physical location of these data items is indicative of a particular attribute value, it is therefore also possible to retrieve the data items having a particular attribute value using the kinetic UI 320 or tracking UI 330. The mobile device's graphical user interface may be used to display the results to the user once the data items are retrieved.

Figure 13A:
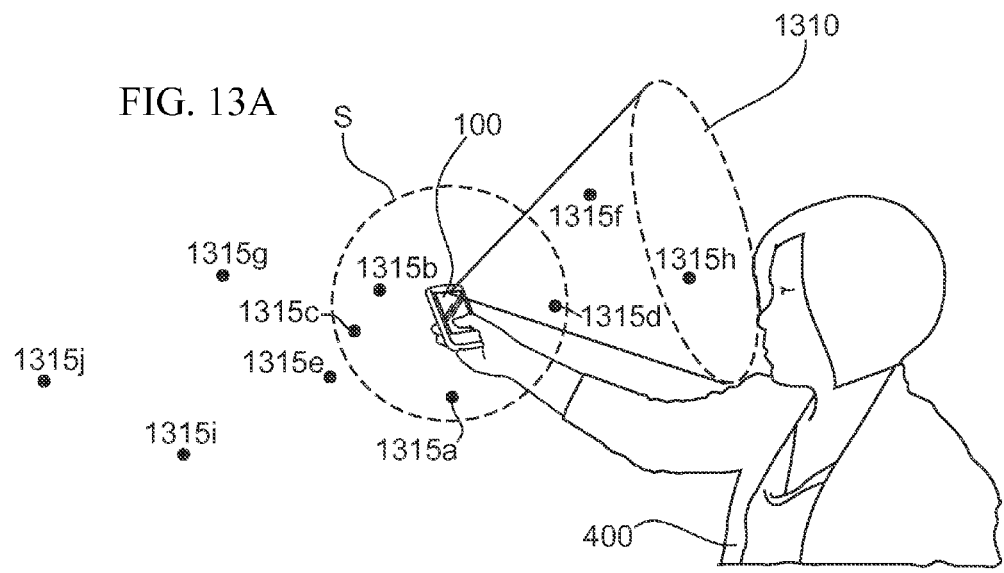
FIGS. 13A and 13B are example perspective views of the user holding the device of FIG. 3 for retrieval of virtually placed data items in the physical space.
Figure 13B:
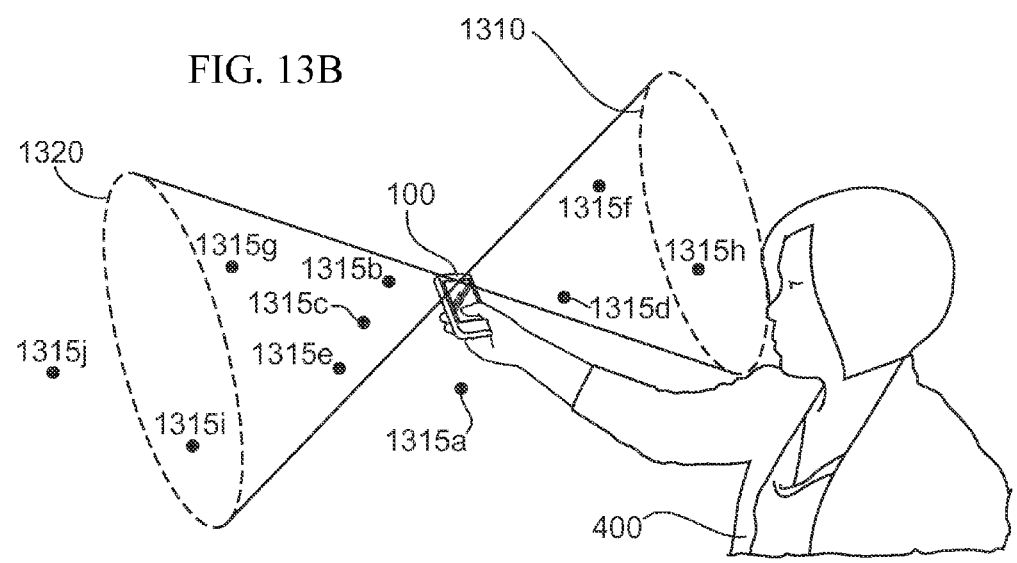

FIGS. 13A and 13B illustrate examples in which the tracking UI 330 and/or kinetic UI 320 may be used to retrieve data items associated with a particular subregion or volume of the physical space 600, and FIGS. 14A to 14D illustrate possible accompanying example views of a retrieval function as they may be displayed on the device 100. The retrieval function may be provided by the workspace manager 300, or by another application such as a universal search application. In some examples, the retrieval function can also be implemented in applications associated with specific data item types, such as calendar events, email messages, memos and the like.

Turning first to FIG. 13A, in a manner similar to that described for the "placement" of data items using the kinetic or tracking UIs, the user places the mobile device 100 in a position within the physical region 600 so that one or both of the tracking UI 330 or kinetic UI 320 may be used to detect the device's position. FIG. 13A illustrates the notional field of view cone described earlier, defining the scope of image data that can be obtained by the camera 126a to determine the position of the mobile device 100 within the physical region 600 (the physical region 600 is not indicated in FIG. 13A or 13B). When the mobile device 100 is in the desired position in the physical region, the user can then input an instruction indicating that the current device position is the desired location and instructing retrieval of data items based on that location. Thus, if the user knows that he has "placed" all his work-related data items in a particular subregion S of the physical region 600, he can simply hold the device 100 in that subregion to "collect" them again. Once the position of the mobile device 100 in the physical region 600 has been detected and provided to the workspace manager 300, the workspace manager 300 retrieves the identifiers for all data items associated with that location in the physical region 600 from its data store 305. The location may be a particular subregion, or a defined radius or volume around the pinpointed location of the mobile device 100. Thus, in the example of FIG. 13A, of the data items 1315a through 1315i assigned to a position in the physical region, only data items 1315a, 1315b, 1315C and 1315d are identified by the workspace manager 300. The remaining data items are located beyond the periphery of subregion S. Once identified, the mobile device 100 can be returned to the home position or to another operating position. The identified data items can then be retrieved and presented to the user via the mobile device 100 using an appropriate interface (display 110, text-to-speech module, etc.). However, in some examples, as the mobile device 100 continues to be moved around in the physical region, the current location of the mobile device 100 is updated at the workspace manager 300, and the workspace manager 300 in turn can continue to identify those data items associated with the current location or surrounding subregion until a command is received to retrieve and present the currently identified data items.

Figures 14A, 14B:
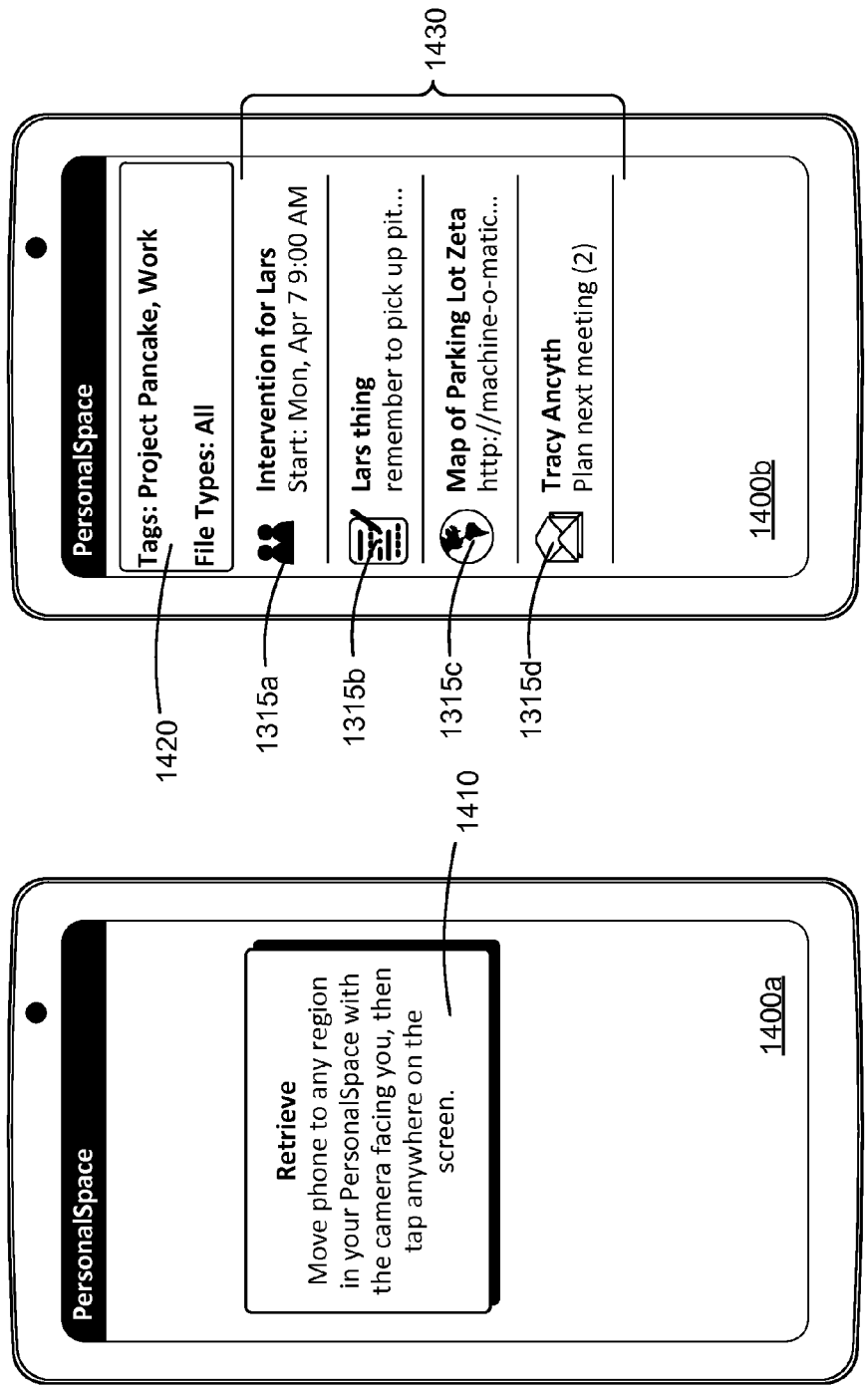

FIGS. 14A and 14B illustrate possible graphical user interface views 1400a, 1400b that may be displayed to the user during this process. FIG. 14A illustrates a simple instructional view 1400a for providing directions to the user in a dialog box 1310 on how to retrieve data items based on their assigned location in the physical region 600. As with similar UI views described above, this instructional view 1400a need not be displayed to the user; the device 100 may instead be configured to receive speech commands, or input via a convenience key or other UI mechanism, to trigger detection of the current position of the mobile device 100 and retrieval of associated data items.

FIG. 14B illustrates a further view 1400b listing a number of data items that were identified by the workspace manager 300 as being associated with the subregion S. In this example, the data items 1315a through 1315d were located, which in this case are a calendar event (1315a); a memo (1315b); a bookmarked webpage (1315c); and an email thread (1315d). In this example, the identified data items are displayed in a list 1430. Optionally, the list can be ordered according to a specified collating criterion or criteria, such as distance from the origin point O (or home position of the mobile device 100); alphabetical order; category; data item type; importance or urgency; and the like. In some examples, if the subregion S is associated with a particular data item characteristic, such as a tag or category, this can be indicated in the view 1400b, such as in UI element 1420. All of these data items are related with the "work" and "Project Pancake" tags in this example.

Turning back to FIG. 13B, rather than merely identifying those data items located in only a surrounding subregion S of the current position of the mobile device 100, the location of the device 100 in the physical region can be used to define a "window" into a specific sector or subregion of the physical region, and data items that are within the field of that "window" are therefore identified by the workspace manager 300. This is illustrated schematically by the "future event" cone 1320, which in this instance is depicted as an extension of the curved surface of the field of view cone 1310. Thus, data items 1315b, 1315c, 1315e, 1315g, 1315i and 1315j are captured in the cone 1320, while data items 1315d, 1315f and 1315h are within the field of view cone 1310. Thus, if the subregion S is defined as the future cone 1320, the depth of the subregion S may theoretically be unbounded, and can include data items, such as 1315j, that have been assigned locations in the physical region that are actually outside the user's physical reach.

If the positions of the data items within the physical region are correlated to time in the manner discussed above, then it can be seen that the data items in the field of view cone

1310—that is closer to the user—are those that are either imminent, current and/or overdue, while those in the "future event" cone 1320 are imminent, current and/or scheduled for the future. If the subregion S is defined only as the future cone 1320, then only current, imminent and/or future events will be identified by the workspace manager 300. However, the subregion could also be defined to include the region defined by the field of view of the camera 126a, i.e., field of view cone 1310, thus capturing past events as well. If the "window" into the physical space is defined as a cone 1320 or as a similar shape extending from a vertex (in this case, the cones converge at the home position of the mobile device 100), then data item 1315a in this example will actually be excluded by the workspace manager 300 when data items are identified. To avoid such exclusions, the "window" may be defined as having a greater area in the vertical plane (i.e., the x-y plane) of the device, much like a conventional, physical window.

Regardless how the window into the subregion is defined, the determination of the current mobile device 100 location and the identification of relevant data items by the workspace manager 300 can be carried out in the manner described above. Once the data items are retrieved, information about the data items can be presented at the mobile device 100 as generally as described above with respect to FIG. 14B. In another example, the retrieved data items can be collated according to distance from the user (or distance from the origin point O of the physical region) or urgency. FIG. 14C illustrates an alternative view 1400c, in which various data items identified by the workspace manager 300 are displayed in a list 1440, ordered according to proximity to the user, with those data items closer to the user being considered more "urgent" or "overdue", based on a correlation between time and distance from the origin point O. An indicator or graphic may be embedded in the list (in this example, heavier line 1445) indicating the relative position of the mobile device 100 among the retrieved data items. If the number of retrieved data items is greater than what can be presented by the mobile device 100 at once, then UI elements, such as arrows 1450, 1455 may be presented to permit the user to review additional retrieved items.

In another example, the retrieved data item information can be presented graphically in a "cloud" format or other visual format other than a list that indicates the relative importance, urgency, etc. of the various data items. These relative values can be illustrated graphically, for example using different colors, positions, or size. If a simulated three-dimensional view of the data items is displayed, the view can reflect the relative three-dimensional positions of the data items in the physical region.

In the example view 1400d of FIG. 14D, icons and text of varying size are presented for each of data items 1315a through 1315j. Data items 1315a through 1315d, being the data items located most proximate to the determined position of the mobile device 100 (for example, those data items in the subregion S illustrated in FIG. 13A, surrounding the mobile device 100) are displayed with icons and accompanying text at a first size. Data items 1315f and 1315h, however, are determined to be "overdue" or past events because their distance from the user (i.e., origin point O) is smaller than the distance of the mobile device 100 from the user; because these are undismissed or undeleted data items, or not marked "done" or "completed" or otherwise archived, they are depicted with larger icon sizes, and optionally with larger text size. They may also be displayed in a more central position on the device display. Data item 1315e, which is outside the bounds of the subregion S and further away from the user but within some defined distance of the user, is depicted with a somewhat smaller icon and text size than the first size used for data items 1315a through d. Finally, data items 1315g, 1315i and 1315j, being furthest away from the user and even in some cases beyond the physical reach of the user, are represented by even smaller icons.

In the examples of FIGS. 14B through 14D, the retrieved data items are presented graphically at the mobile device 100. As noted above, presentation of the retrieved data items may instead be audible. While use of the existing user interface mechanisms on the mobile device 100 is convenient, additional accessories, such as virtual reality accessories may be used to review and to interact with the data items in the physical space 600. For example, virtual reality goggles or a headset may permit the user to actually "view" the data items in three-dimensional space, much as they are illustrated in FIG. 13A or 13B.

Figure 15A:
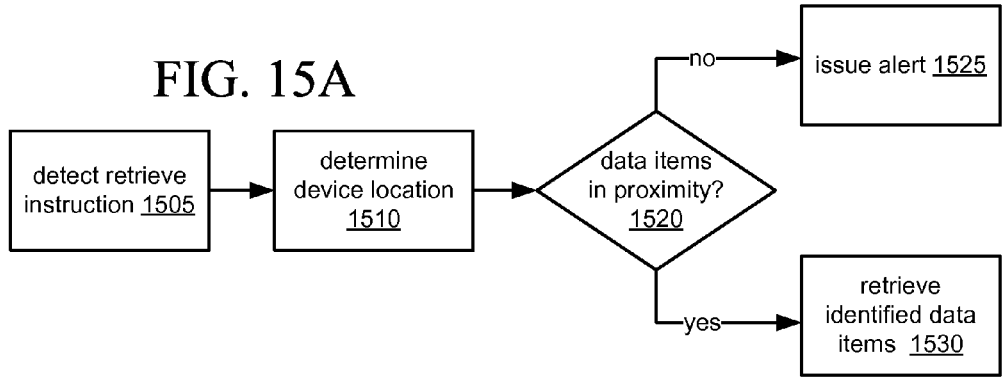
FIGS. 15A and 15B are flowcharts illustrating methods of retrieving virtually placed data items.
Figure 15B:
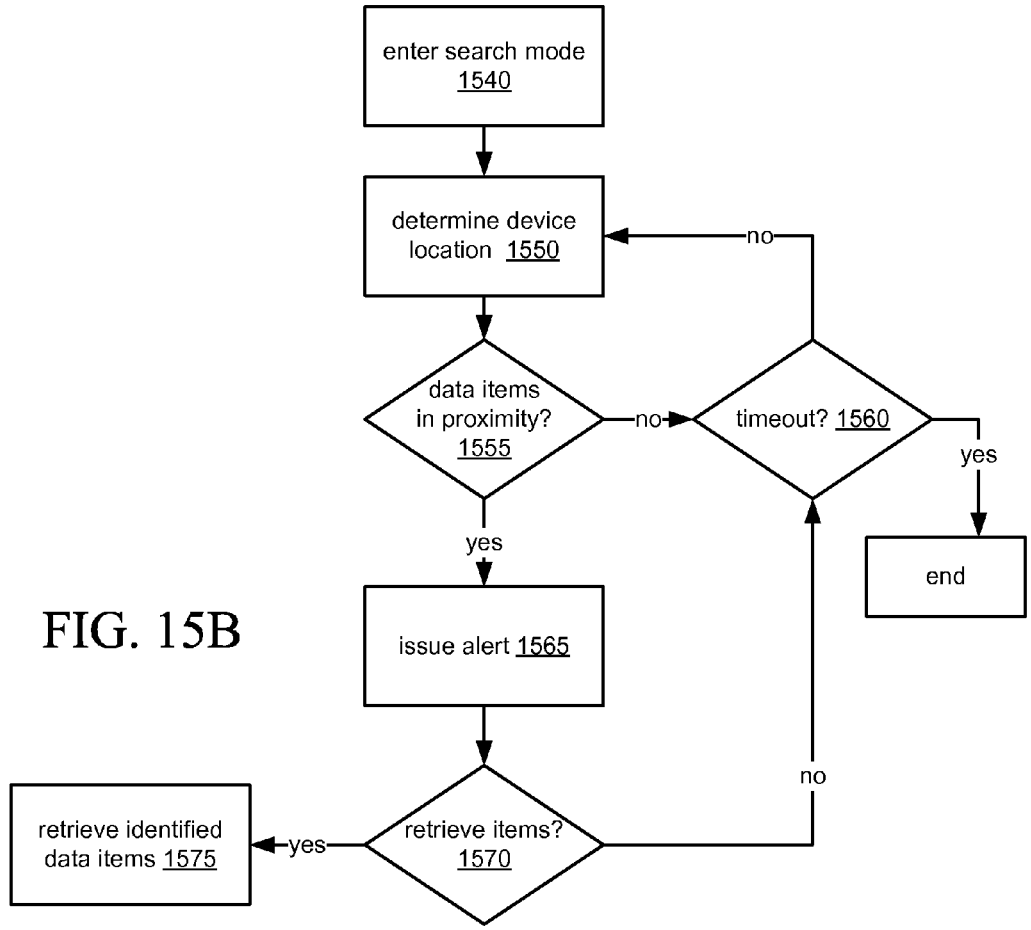

FIGS. 15A and 15B illustrate retrieval and search methods for use with the examples given above. Turning first to FIG. 15A, a retrieval method similar to that illustrated by the views 1400a and 1400b is provided. At 1505, an instruction to retrieve data items is detected by the mobile device 100. At 1510, the current physical location of the mobile device 100 in the physical region 600 is determined. At 1520, it is determined whether there are any data items in proximity to the current detected physical location; this is carried out by querying the data store 305 for any data items having an associated location within a specified range of the detected physical location coordinates; to account for variations, a tolerance, for example of about 10 cm (4 inches) around the detected physical location may be permitted. As another option, the determination at 1520 may be carried out by identifying a tag value or other data item characteristic associated with that detected physical location, and then querying the data store 305 for any data items having that data item characteristic. As a variant of this last option, the determination at 1520 may be carried out by identifying a subregion in which the current detected physical location resides, and then identifying any data items associated with that subregion. One or more of these options may be carried out during the determination at 1520 to ensure that all possible data items have been identified. If no data items are in fact identified at 1520, then an alert may be issued to the user at 1525 indicating this. Otherwise, the identified data items are retrieved at 1530 from the appropriate data store(s) and presented to the user for review. The user can bring the mobile device 100 back to an operational position (e.g., the home location) and use the graphical user interface to inspect the results.

A search mode, illustrated in FIG. 15B, can operate in a manner similar to retrieval. At 1540, the device 100 enters a search mode, which may be in response to an express command to "search" for data items in the physical region 600. The tracking UI 330, kinetic UI 320, or both, is operational in this mode to detect the current position of the mobile device 100 at 1550. Based on the determined device location from 1550, it is determined at 1555 whether there are any data items in proximity of the current detected location. This determination is carried out in a similar manner to 1520 of FIG. 15A. If no data items are detected, then it is determined whether a timeout condition has been reached at 1560. If this is the case, the method ends. If not, the method cycles back to 1550, where the current device location is redetermined.

However, if data items are detected that the current device location, an alert may be issued to the user at 1565. Since the mobile device 100 is likely not in the home position, or in a position in which the user can easily interact with the display screen, the alert may be vibratory or audible. The alert may also be a simple visual cue, such as a flashing LED or beacon light, or a flashing display screen. Once the alert has been issued, it is determined whether a command has been received to retrieve the identified data items at 1570. If such a command is received (this command may be received using any appropriate UI mechanism, including speech) the identified data items are retrieved for presentation at 1575, at which point the user may bring the mobile device 100 back to an operational position. If no command is received, the method returns to 1560 and will thus either end, or continue with a further redetermination of device location. This search function thus allows the user to "sound out" the surrounding physical region 600 for any data items he may have placed in the region earlier.

The association of data items with locations within the physical region 600 thus permits the user to collect data items in a physical location and retrieve them all at once, regardless of the specific data type or subject matter. This permits the user to arrange data items in a spatial relationship with each other, and with the user, but without reference to any external physical objects such as the aforementioned desk or side table; the only reference is to the physical region 600 that is defined in fixed relation to the user himself. Thus, the data items and their spatial relationships can travel with the user, provided the user has his mobile device 100.

Thus, in accordance with the examples provided herein, there is provided a method implemented by a mobile device, the method comprising: associating at least one defined location in a physical region with at least one data item characteristic, the physical region and at least one defined location being in fixed relation to a user of the mobile device; storing, at the mobile device, a location in the physical region in association with a data item; and in response to determining that the location of the data item is associated with a location corresponding to one of the at least one defined locations, associating the data item with the at least one data item characteristic corresponding to that defined location.

In one aspect, the defined location comprises a region of space within the physical region defined using at least one of a tracking user interface and a kinetic user interface of the mobile device to determine a position of the mobile device in relation to the user.

In another aspect, storing the location in the physical region in association with the data item comprises the mobile device: obtaining the data item; and detecting a current physical position of the mobile device in the physical region, the location in the physical region comprising the detected current physical position.

In still another aspect, detecting the physical position comprises the mobile device: obtaining image data using a camera provided on the mobile device, the image data comprising an image representation of the user; and computing the physical position of the mobile device based on a position and size of the image representation of the user.

In yet another aspect, obtaining the data item comprises the mobile device receiving input data for the data item while the mobile device is positioned at the detected current physical position.

In another aspect, associating at least one defined location in the physical region with the data item characteristic comprises populating the defined location with at least one other data item associated with that data item characteristic.

Still further, associating at least one defined location in the physical region with the data item characteristic may comprise assigning the data item characteristic to the at least one defined location.

In a further aspect, the physical region comprises a region of space in which the mobile device can be physically positioned while being held by the user, and/or is defined independent of a terrestrial position of either the mobile device or the user and/or is defined in fixed relation to both a position and orientation of the user.

In another aspect, the at least one data item characteristic comprises at least one of a topical characteristic, a temporal characteristic, a sensitivity characteristic, an importance characteristic, and a permissions characteristic.

Still further, the method may further comprise: after associating the data item with the at least one data item characteristic, detecting a change to the associated data item characteristic; and in response to detecting the change to the associated data item characteristic, associating the data item with a further one of the at least one defined location corresponding to the changed associated data item characteristic.

In another aspect, the method may further comprise, after storing the location in the physical region in association with the data item, detecting a current physical position of the mobile device in the physical region; identifying at least one data item associated with a location in the physical region proximate to the detected current physical position; and retrieving information for each of the at least one data item thus identified for presentation at the mobile device.

There is also provided a mobile device such as the electronic devices described herein, including: at least one of a tracking user interface and a kinetic user interface; at least one memory module; a processor in communication with the at least one of the tracking user interface and the kinetic user interface and the at least one memory module, the processor being configured to implement the example methods and various aspects set out above.

There is also provided an electronic device-readable medium, which may be physical or non-transitory, and which may be provided in a computing program product, bearing code which, when executed by a processor of an electronic device, causes the electronic device to implement the example methods It should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits such as custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method implemented by a mobile device, the method comprising:
    associating at least one defined location in a physical region with at least one data item characteristic, the physical region and the at least one defined location being defined in relation to a reference point, the reference point being fixed relative to a body of a user of the mobile device;
    storing, at the mobile device, a location in the physical region in association with a data item, the location associated with the data item being determined relative to the reference point;
    in response to a determination that the location associated with the data item corresponds to one of the at least one defined locations, associating the data item with the at least one data item characteristic corresponding to that defined location;
    detecting translational movement of the mobile device to a current position in the physical region;
    determining the current position of the mobile device relative to the reference point; and
    when the current position of the mobile device is determined to be proximate to the location associated with the data item, retrieving information for the data item for presentation on the mobile device.

2. The method of claim 1, wherein the defined location comprises a region of space within the physical region defined using at least one of a tracking user interface and a kinetic user interface of the mobile device.

3. The method of claim 1, wherein storing the location in the physical region in association with the data item comprises the mobile device:
    obtaining the data item; and
    detecting a position of the mobile device in the physical region during the obtaining of the data item, the location in the physical region comprising the detected position.

4. The method of claim 3, wherein detecting the physical position comprises the mobile device:
    obtaining image data using a camera provided on the mobile device, the image data comprising an image representation of the user; and
    computing the physical position of the mobile device based on a position and size of the image representation of the user.

5. The method of claim 3, wherein obtaining the data item comprises the mobile device receiving input data for the data item while the mobile device is positioned at the detected current physical position.

6. The method of claim 1, wherein associating at least one defined location in the physical region with the data item characteristic comprises populating the defined location with at least one other data item associated with that data item characteristic.

7. The method of claim 1, wherein associating at least one defined location in the physical region with the data item characteristic comprises assigning the data item characteristic to the at least one defined location.

8. The method of claim 1, wherein the physical region comprises a region of space in which the mobile device can be physically positioned while being held by the user.

9. The method of claim 1, wherein the physical region is further defined independent of a terrestrial position of either the mobile device or the user.

10. The method of claim 1, wherein the at least one data item characteristic comprises at least one of a topical characteristic, a temporal characteristic, a sensitivity characteristic, an importance characteristic, and a permissions characteristic.

11. The method of claim 1, further comprising:
    after associating the data item with the at least one data item characteristic, detecting a change to the associated data item characteristic; and
    in response to detecting the change to the associated data item characteristic, associating the data item with a further one of the at least one defined location corresponding to the changed associated data item characteristic.

12. A mobile device, including:
    at least one of a tracking user interface and a kinetic user interface;
    at least one memory module;
    a processor in communication with the at least one of the tracking user interface and the kinetic user interface and the at least one memory module, the processor being configured to:
        associate at least one defined location in a physical region with at least one data item characteristic, the physical region and the at least one defined location being defined in fixed relation to reference point, the reference point being fixed relative to a body of a user of the mobile device;
        store, in the at least one memory module, a location in the physical region in association with a data item, the location associated with the data item being determined relative to the reference point;
        in response to a determination, using at least one of the tracking user interface and the kinetic user interface, that the location associated with the data item corresponds to one of the at least one defined locations, associate the data item with the at least one data item characteristic corresponding to that defined location;

detect, using at least one of the tracking user interface and the kinetic user interface, translational movement of the mobile device to a current position in the physical region;

determine the current position of the mobile device relative to the reference point; and when the current position of the mobile device is determined to be proximate to the location associated with the data item, retrieving information for the data item for presentation on the mobile device.

13. The mobile device of claim 12, wherein the defined location comprises a region of space within the physical region defined using the tracking user interface.

14. The mobile device of claim 12, wherein the processor is configured to store the location in the physical region in association with the data item by:

obtaining the data item; and detecting, using the at least one of the tracking user interface and the kinetic user interface, a position of the mobile device in the physical region during the obtaining of the data item, the location in the physical region comprising the detected position.

15. The mobile device of claim 14, wherein detecting the physical position comprises the mobile device:

obtaining image data using a camera provided on the mobile device, the image data comprising an image representation of the user; and computing the physical position of the mobile device based on a position and size of the image representation of the user.

16. The mobile device of claim 14, wherein obtaining the data item comprises the receiving input data for the data item while the mobile device is positioned at the detected current physical position.

17. The mobile device of claim 12, wherein the processor is configured to associate the at least one defined location in the physical region with the data item characteristic by populating the defined location with at least one other data item associated with that data item characteristic.

18. The mobile device of claim 12, wherein the processor is configured to associate the at least one defined location in the physical region with the data item characteristic by assigning the data item characteristic to the at least one defined location.

19. The mobile device of claim 12 wherein the physical region comprises a region of space in which the mobile device can be physically positioned while being held by the user.

20. The mobile device of claim 12, wherein the physical region is further defined independent of a terrestrial position of either the mobile device or the user.

21. The mobile device of claim 12, wherein the at least one data item characteristic comprises at least one of a topical characteristic, a temporal characteristic, a sensitivity characteristic, an importance characteristic, and a permissions characteristic.

22. The mobile device of claim 12, wherein the processor is further configured to:

after associating the data item with the at least one data item characteristic, detect a change to the associated data item characteristic; and in response to detecting the change to the associated data item characteristic, associate the data item with a further one of the at least one defined location corresponding to the changed associated data item characteristic.

\* \* \* \* \*

UNITED STATES PATENT AND TRADEMARK OFFICE
CERTIFICATE OF CORRECTION

| | | Page 1 of 1 |
|---|---|---|
| PATENT NO. | : 8,532,675 B1 | |
| APPLICATION NO. | : 13/534226 | |
| DATED | : September 10, 2013 | |
| INVENTOR(S) | : Jerome Pasquero and David Ryan Walker | |

It is certified that error appears in the above-identified patent and that said Letters Patent is hereby corrected as shown below:

Title page, item [73], Assignee: delete "Blackberry Limited" and insert therefor --BlackBerry Limited--;

In the Specification

Column 23, line 39, delete "mobile device 1000" and insert therefor --mobile device 100--;
Column 23, line 41, delete "first view 100" and insert therefor --first view 1000c--;

Column 28, line 50, delete "mobile device 1000" and insert therefor --mobile device 100--;

Column 30, line 56, delete "o and 15" and insert therefor --0 and 15--; and

Column 32, line 4, delete "1315C" and insert therefor --1315c--.

Signed and Sealed this
Twelfth Day of November, 2013

Teresa Stanek Rea
*Deputy Director of the United States Patent and Trademark Office*